US006954877B2

(12) United States Patent
Earl et al.

(10) Patent No.: US 6,954,877 B2
(45) Date of Patent: Oct. 11, 2005

(54) FAULT TOLERANCE USING LOGICAL CHECKPOINTING IN COMPUTING SYSTEMS

(75) Inventors: William J. Earl, Boulder Creek, CA (US); Jeff Tofano, San Jose, CA (US)

(73) Assignee: Agami Systems, Inc., San Jose, CA (US)

(*) Notice: Subject to any disclaimer, the term of this patent is extended or adjusted under 35 U.S.C. 154(b) by 517 days.

(21) Appl. No.: 09/997,877

(22) Filed: Nov. 29, 2001

(65) Prior Publication Data
US 2004/0199812 A1 Oct. 7, 2004

(51) Int. Cl.[7] .............................................. G06F 11/00
(52) U.S. Cl. .............................. 714/13; 714/11; 714/12
(58) Field of Search ............................ 714/10, 11, 12, 714/13

(56) References Cited

U.S. PATENT DOCUMENTS

| 4,228,496 A | 10/1980 | Katzman et al. |
|---|---|---|
| 4,590,554 A | 5/1986 | Glazer et al. |
| 4,823,256 A | 4/1989 | Bishop et al. |
| 5,155,678 A | 10/1992 | Fukumoto et al. |
| 5,157,663 A | 10/1992 | Major et al. |
| 5,271,013 A | 12/1993 | Gleeson |
| 5,363,503 A | 11/1994 | Gleeson |
| 5,432,926 A | 7/1995 | Citron et al. |
| 5,455,932 A | 10/1995 | Major et al. |
| 5,621,885 A | 4/1997 | Del Vigna, Jr. |
| 5,684,991 A | 11/1997 | Malcolm |
| 5,802,265 A | 9/1998 | Bressoud et al. |
| 5,845,328 A | 12/1998 | Maya et al. |
| 5,968,185 A | 10/1999 | Bressoud et al. |
| 6,119,129 A | 9/2000 | Traversat et al. |
| 6,161,193 A | 12/2000 | Garg et al. |
| 6,256,751 B1 | 7/2001 | Meth et al. |
| 6,275,953 B1 * | 8/2001 | Vahalia et al. ................ 714/11 |
| 6,584,477 B1 * | 6/2003 | Mosher, Jr. ................. 707/204 |

FOREIGN PATENT DOCUMENTS

JP          40-5055934 A      3/1993

* cited by examiner

*Primary Examiner*—Nadeem Iqbal
*Assistant Examiner*—Timothy M. Bonura
(74) *Attorney, Agent, or Firm*—DLA Piper Rudnick Gray Cary US LLP

(57) ABSTRACT

A system and method for checkpointing a primary computer process to a backup computer process such that if there is a failure of a primary process, the backup process can take-over without interruption. In addition, upgrades to different version of software or equipment can take place without interruption. The invention provides a lightweight checkpointing method that allows checkpointing of only external requests or messages that change the state of the service instance, thereby reducing the overhead and performance penalties. In addition, the present invention checkpoints data for primary and backups that do not share resources but are logically equivalent. All communication between the primary and backup takes places using network protocols.

81 Claims, 17 Drawing Sheets

Software Migration Overview

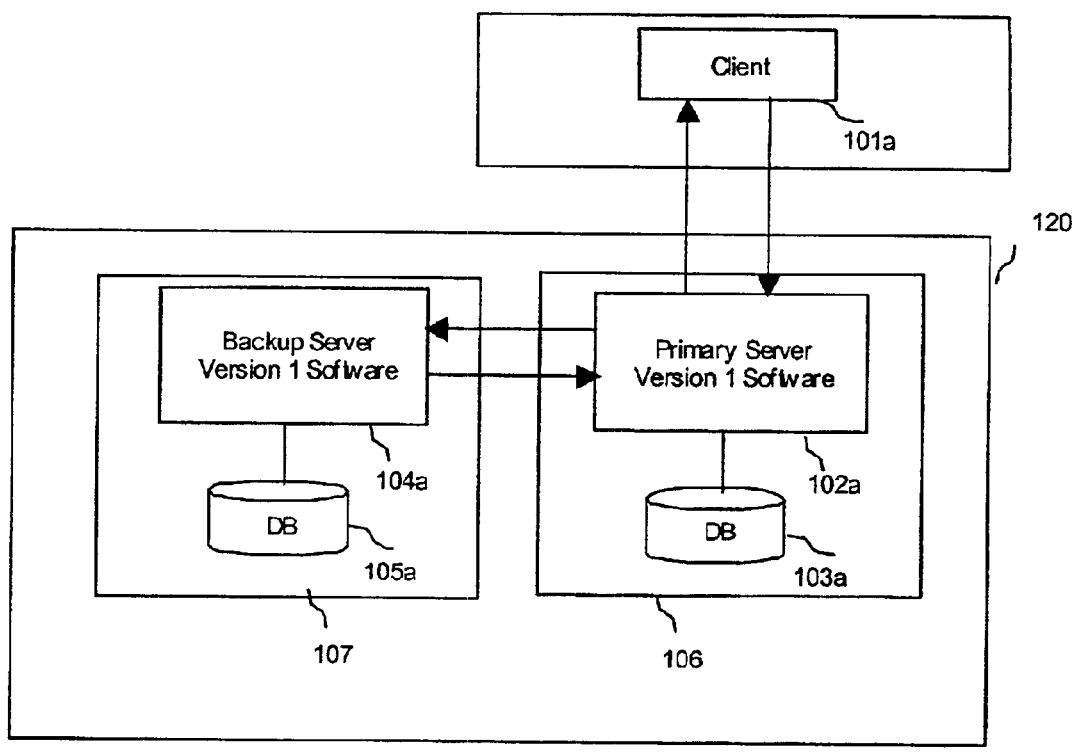
FIG. 2A1
(Initial Software Configuration)

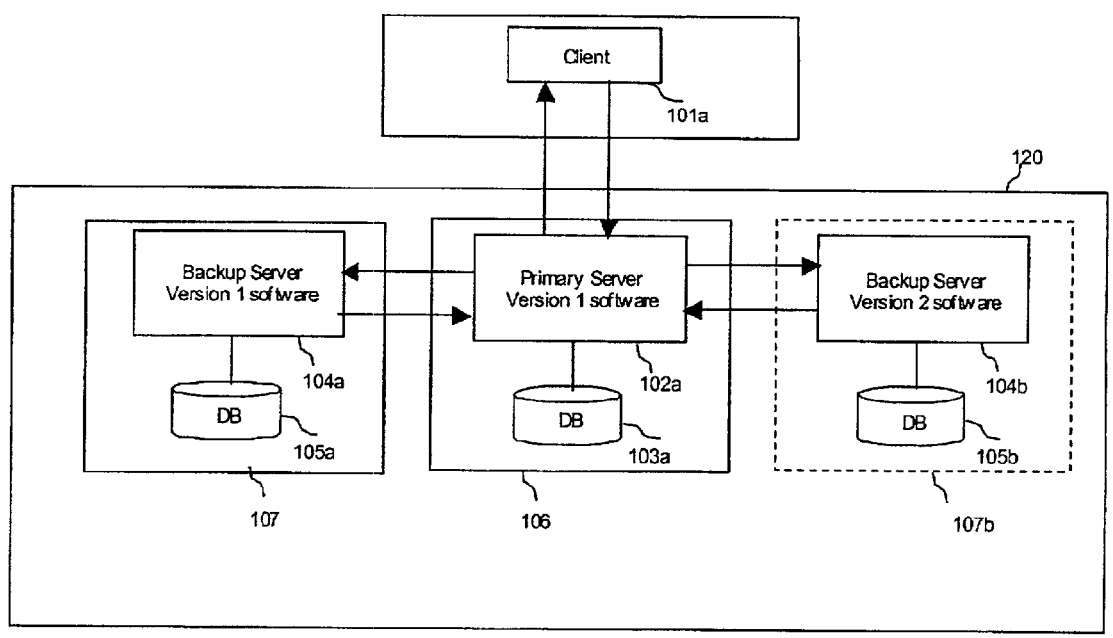
FIG. 2A2
(Partial Software Migration Configuration)

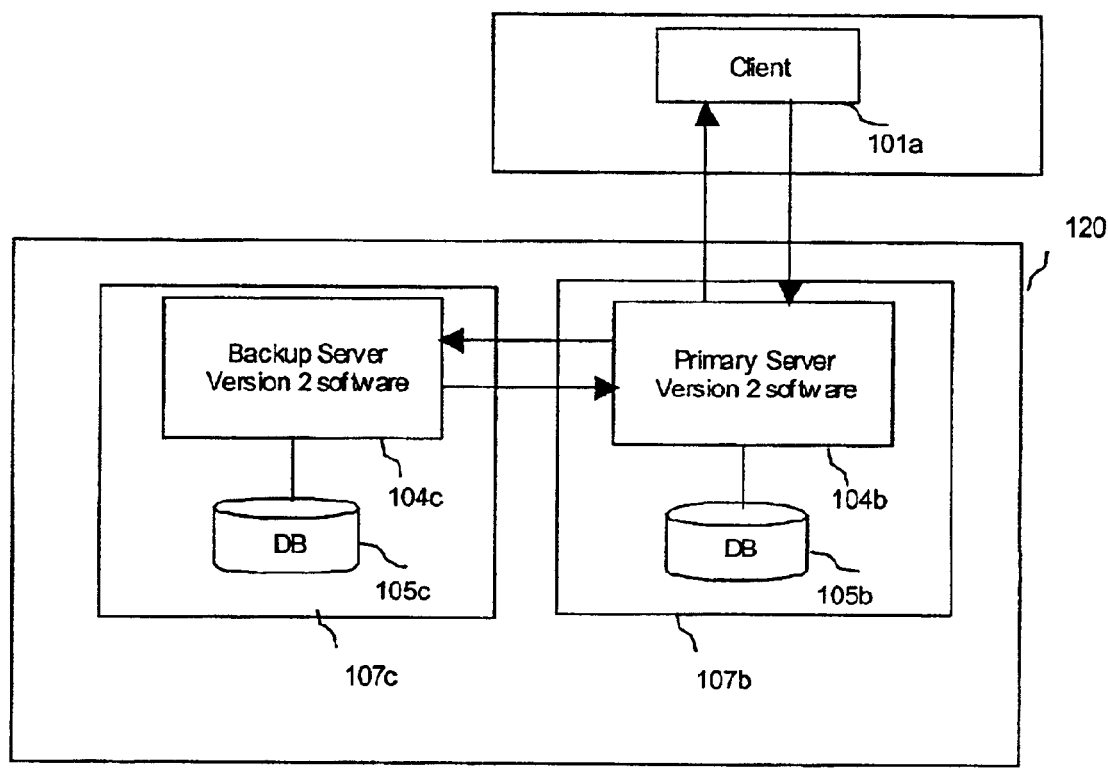
FIG. 2A3
(Completed Software Migration Configuration)

Hardware Migration Overview

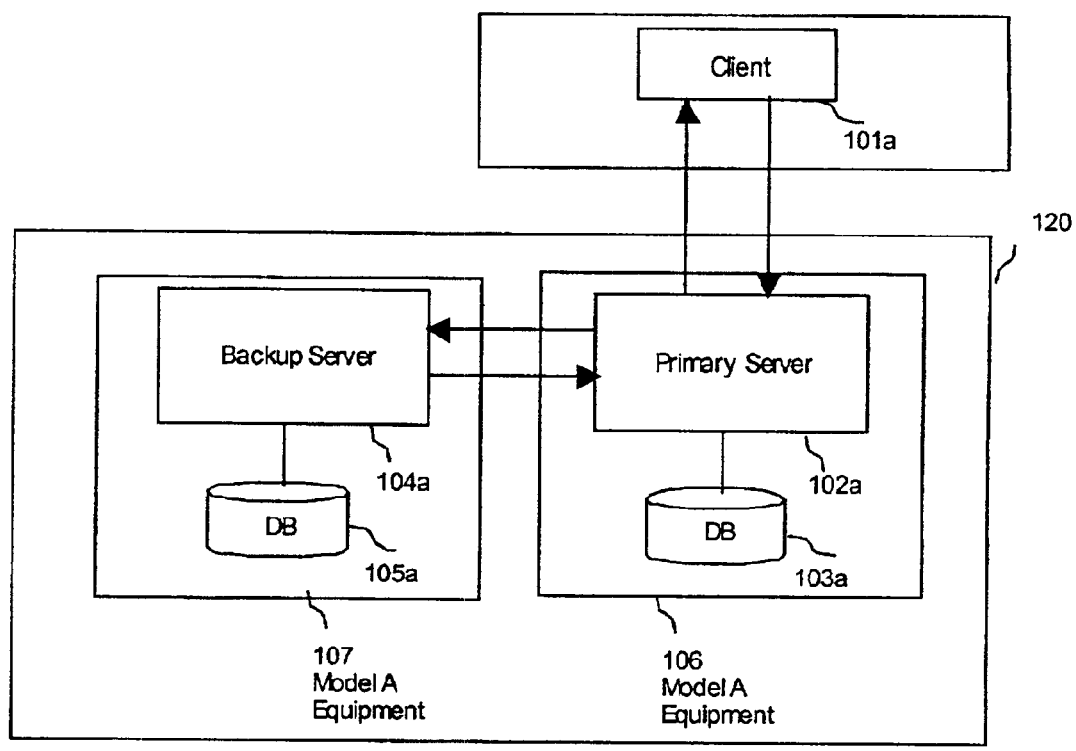
FIG. 2B1
(Initial Hardware Configuration)

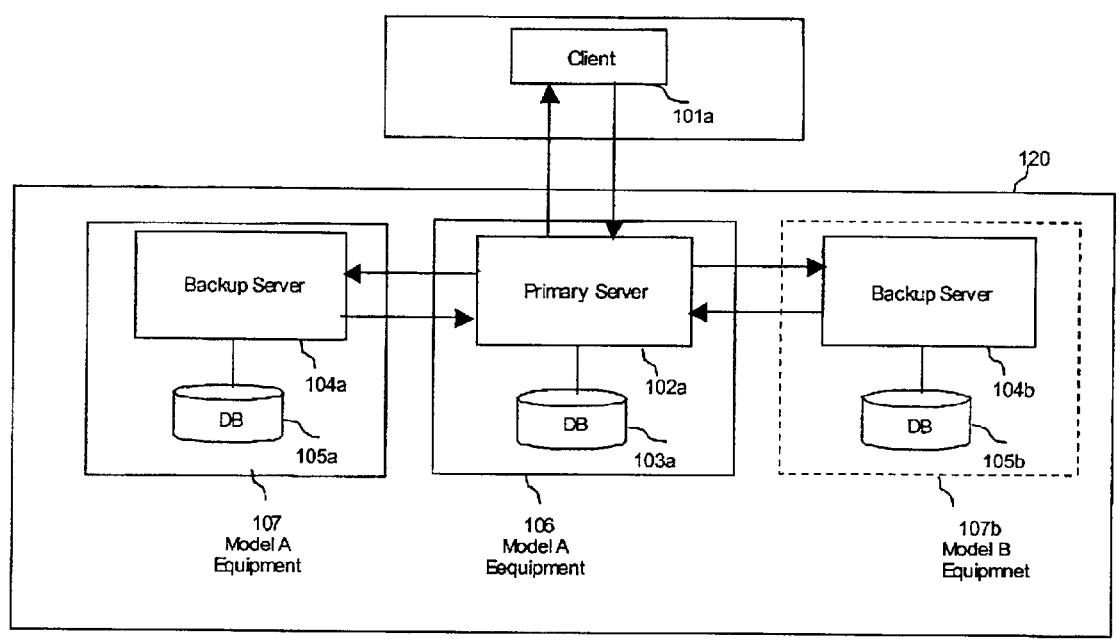
FIG. 2B2
(Partial Hardware Migration Configuration)

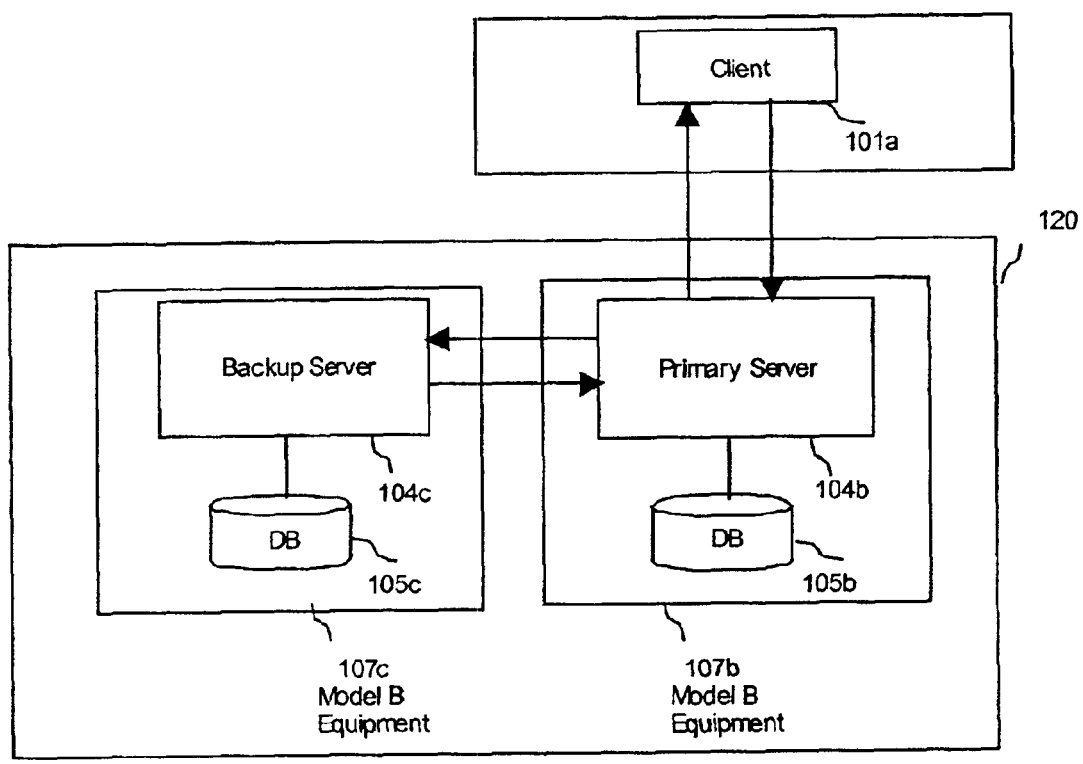
FIG. 2B3
(Completed Hardware Migration Configuration)

Transaction Processing - Batch of Entries

Transaction Processing - Individual Entries

FAULT TOLERANCE USING LOGICAL CHECKPOINTING IN COMPUTING SYSTEMS

TECHNICAL FIELD

The present invention relates generally to computing systems, and more particularly to a method and apparatus for checkpointing in computing systems. Checkpointing allows processes to save their state periodically so that they can be restarted in the event of failure.

BACKGROUND OF THE INVENTION

In many computing environments, it is desirable to provide continuous operation, even in the event of component failure. To maintain operation of a computing system during a component failure requires fault tolerance. One known technique for achieving fault tolerance employs a redundant process pair. The primary process actually performs the work and periodically synchronizes a backup process with the primary process using checkpointing techniques. With prior known checkpointing techniques, the primary sends messages that contain information about changes in the state of the primary process to the backup process. Immediately after each checkpoint, the primary and backup processes are in the same state.

In other prior known checkpointing methods, distinctions between operations that change state (such as write operations) and operations that do not change the state (such as read operations) are not made, and all operations are checkpointed to the backup process. Such a system is shown in U.S. Pat. No. 4,590,554 (Glazer—Parallel Computer Systems) where all inputs to the primary are provided via messages and all messages sent to the primary are made available to the secondary or backup, essentially allowing the backup to "listen in on" the primary's messages. Another such system is described in and U.S. Pat. No. 5,363,503 (Gleeson—Unisys Corporation) where checkpointing is provided as described in U.S. Pat. No. 4,590,554.

Other prior art, such as that shown in U.S. Pat. No. 4,228,496 (Katzman—Tandem Computers), describe that the primary receives a message, processes the message, and produces data. The produced data is stored in the primary's data space thereby changing the primary's data space. The change in the primary's data space causes a checkpointing operation of the data space to be made available to the backup. Thus, there is frequent copying of the primary's data space to the backup's data space, which uses a significant amount of time and memory for transferring the state of the primary to the backup. It may also result in the interruption of service upon failure of the primary. The overhead for such checkpointing methods can have considerable performance penalties.

Other prior art examples attempt to update only portions of the state of the primary that has changed since the previous update, but use complex memory and data management schemes. In others as shown in U.S. Pat. No. 5,621,885 (Del Vigna—Tandem Computers) the primary and backup, which run on top of a fault tolerant runtime support layer (that is, an interface between the application program and operating system) are resident in memory and accessible by both the primary and backup CPUs used in the described fault-tolerance model. The primary and backup processes perform the same calculations because they include the same code.

[Possible other prior art: Pat. Nos. 5,455,932; 5,157,663; 4,823,256; 5,155,678; 5,968,185; 5,802,265]

In addition, systems that provide fault tolerance and implement conventional checkpointing schemes are physically equivalent in their implementation or at least share resources.

In light of the above, it is desirable to arrive at an approach to checkpointing that may be used to foster fault-tolerance without some or all of the drawbacks to conventional checkpointing approaches described above.

SUMMARY OF THE INVENTION

According to the disclosed embodiments, a computing system provides a mechanism for checkpointing in a fault-tolerant service. The service is made fault tolerant by using a process pair; the primary process performs the work officially, while one or more backup processes provide a logical equivalent that can be used in the event of failure.

In accordance with an aspect of the invention, it provides checkpointing that allows the primary and backup to be logically equivalent at any given point in time, but may be internally different physically or in their implementation.

According to another aspect of the present invention, it provides checkpointing for a primary and backup that do not share physical resources, their failure domains are independent, and they do not have any version conflicts with respect to the internal state of their private resources.

Another aspect of the present invention provides checkpointing for a primary and backup that communicate with each other via network protocols.

Another aspect of the present invention provides lightweight or simplified checkpointing for a primary and backup by checkpointing only external requests or messages that changes the state of the service instance. Checkpointing is not applied to read operations.

Another aspect of the present invention provides checkpointing that allows rolling upgrades to new versions of software or equipment.

In view of the foregoing aspects and others, the present invention provides a system and method for logical checkpointing. According to the disclosed embodiments, checkpointing is lightweight and greatly simplified as a result of checkpointing only the external view. This is in contrast to conventional approaches that provide checkpointing of the internal state.

BRIEF DESCRIPTION OF THE DRAWINGS

FIGS. 2A1 to 2A3 are block diagrams of software configurations according to an embodiment.

FIGS. 2B1 to 2B3 are block diagrams of hardware configurations according to an embodiment.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The preferred embodiment of the present invention will be described herein with reference to an exemplary implementation of a fault-tolerant service in a distributed computing environment. However, the present invention is not limited to this exemplary implementation, but can be practiced in any computing environment including a distributed storage system.

Figure 1:
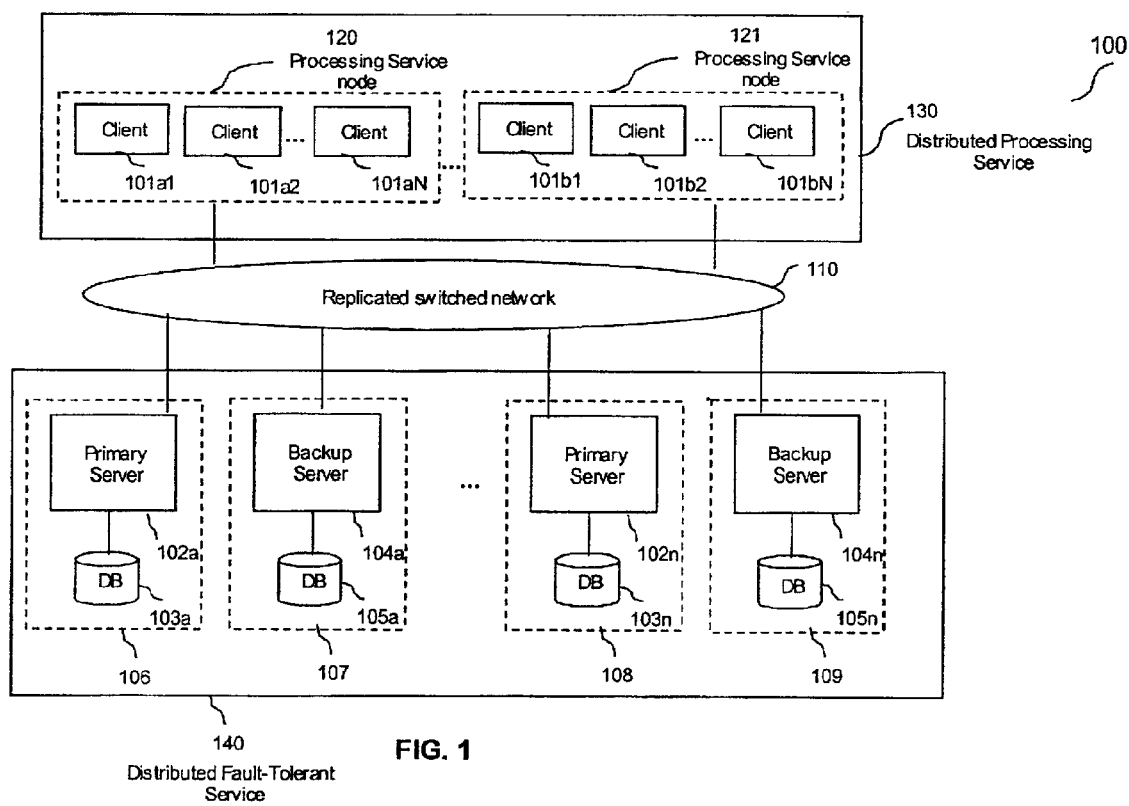
FIG. 1 is a block diagram of an exemplary distributed, highly scalable computing system 100 incorporating one embodiment of a mechanism for logically checkpointing in a fault-tolerant service

Looking now to FIG. 1, illustrated is an exemplary distributed, highly scalable computing system 100 incorporating a mechanism for logically checkpointing in a fault-tolerant service. The distributed computing system 100 includes a distributed Processing Service 130 made up of one or more Processing Service nodes 120–121. A Processing Service node includes one or more clients (101a1–101an and 101b1–101bn). The client can be a machine, a process on a machine, or even a thread within a specific type of process. (In general, "n" is used herein to indicate an indefinite plurality, so that the number "n" when referred to one component does not necessarily equal the number "n" of a different component. For example, the number of clients 101a1–101an does not necessarily, but may, equal the number of Primary Service Instances 102a–102n in FIG. 1). Each client process is connected to an interconnect mechanism 110, for example, but without limitation, a switched Internet Protocol (IP) based network, a bus, or some other interconnect mechanism including wireless. Interconnect mechanism 110 can provide connectivity to any number of distributed scalable services, for example, but without limitation a distributed, scalable, and fault-tolerant service 140.

A distributed, scalable, and fault-tolerant service 140, which is a component of the highly scalable computing system 100, can be made up of one or more primary and backup service instance pairs. A primary service instance (106 and 108) is made up of a primary server (102a and 102n respectively) and can include a persistence mechanism including but not limited to a database (103a and 103n respectively) while a backup service instance (107 and 109) is made up of a backup server (104a and 104n respectively) and can include a database (105a and 105n respectively). The database portions are not essential to an embodiment, but can be part of the service instances. The terms primary server and primary (used by itself) can be used interchangeably. Similarly, the terms backup server and backup (used by itself) can be used interchangeably. It should be noted that a primary service instance could have more than one backup service instance associated with it. The primary service instance and its one or more backup service instances reside on separate failure domains, for example, but not limited to physical machines, to ensure independent failure, thereby avoiding the primary service instance and its one or more backup service instances failing together.

In accordance with the principles of the present invention, these components are provided for purposes of illustration only and are not limiting. The services can be any service, for example but not limited to, a highly scalable service and a fault-tolerant service. Of course, while only two services are shown 130 and 140, many more of each of these services and servers may be connected to one another via a network. In the example shown, the highly scalable service 130 includes a plurality of clients, while service 140 includes a fault-tolerant process pair.

At any point in time, the primary (102a–102n) and backup servers (104a–104n) are logically equivalent but may be physically, or in their implementation, entirely different internally. This means that even during the process of migrating the server pair to different resources such as a new version of software or new hardware equipment, the primary and the one or more backups have the same logical internal state. If the servers start processing from the same initial state and the same requests are applied in parallel on both sides (on the primary and backup), their internal logical states, notwithstanding the difference in the underlying hardware and/or software resources, are the same. It should be noted that the protocol used to migrate to new equipment or software, that is, whether availability is required or not, can be determined by customer needs. An embodiment can support both protocols, that is, it can support making the system continuously available or temporarily unavailable during these transitions. In this way, an embodiment allows migration to different resources, both software and hardware, to be achieved very easily and with or without disruption.

Figure 2A:
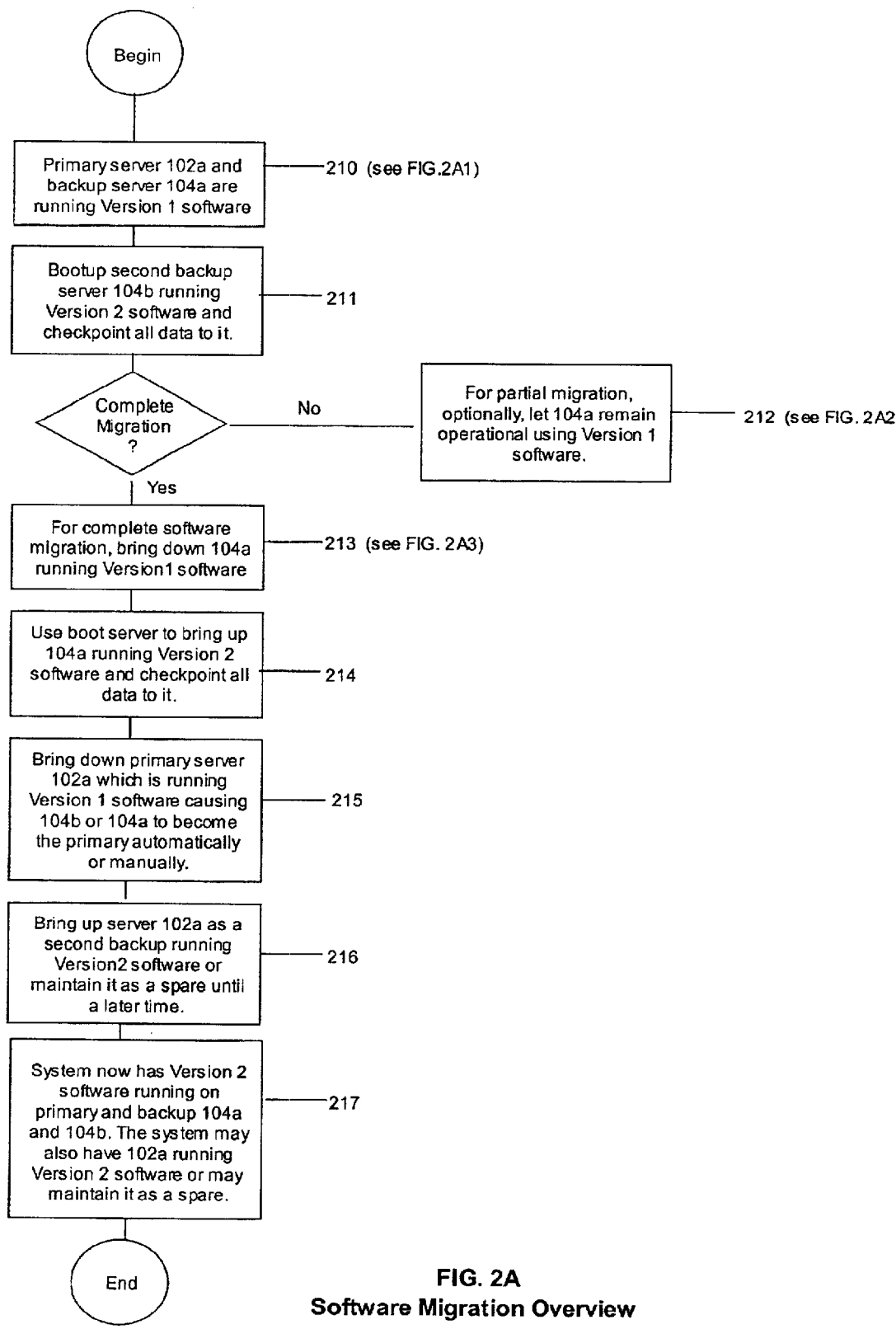
FIG. 2A is a flowchart that provides an overview of software migration according to an embodiment.

In accordance with the embodiments, the results of processing incoming requests are the same not because the primary and backup servers have identical internal data, but rather because they execute the same requests in parallel. The primary and backup servers can be running different versions of software and continue to have logically the same data and provide the same responses to requests. In other words, processed inputs are the same at the primary and the backup, the processing may or may not be the same, but the results of the processing are the same at both the backup and the primary. FIG. 2A is a flowchart that provides an overview of software migration in accordance with an embodiment of the present invention. In this example, the primary server (102a) and the backup server (104a) are running Version 1 software (step 210). For an example of an initial software configuration of an embodiment, see FIG. 2A1. A spare (104b) is brought up to run Version 2 software and all data is checkpointed to the server 104b to bring it current (step 211). Version numbers are for purposes of illustration only and the present invention can accommodate any version of software for which an upgrade or downgrade path is supported. After (104b) is up with Version 2 software and all data is checkpointed to bring backup server (104b) current, backup server (104a) can optionally be taken off line or remain operational running Version 1 software (step 212) See FIG. 2A2 for an example of a partial software migration configuration. An embodiment of the present invention allows the system to continue running with one or two backups using the same or different software. In either case, fault-tolerance continues to be maintained and a single point of failure does not exist. This type of partial software migration allows servers (primary 102a and one or more backups 104b and 104a) to run with different versions of the software while logically continuing to have the same data and responding to requests and messages in the same way.

An embodiment of the present invention can also accommodate complete software migration, which can include rolling upgrades (the process of upgrading software without making a service unavailable). See FIG. 2A3 for an example of a configuration showing completed software migration. To achieve complete software migration without disruption, bring down the second backup (104a), which is currently running Version 1 software (step 213). Use the boot server to bring the server (104a) up again with Version 2 software and checkpoint data to it and bring server (104a) current (step 214). As soon as the backup is current, switch over a backup (104b or 104a) and use it as a primary running Version 2 (step 215). The switchover process can be automated by the software or can be done manually. Server (102a) can remain off line and maintained as a spare or it can be rebooted with Version 2 software and placed back into service (step 216). The system now has server 104b running Version 2 software as primary, server 104a running Version 2 software as backup, and depending on whether 102a is maintained as a spare or made operational, perhaps 102a running Version 2 software as a backup (step 217). Software migration is complete without the system becoming unavailable during the transition to new software.

Figure 2B:
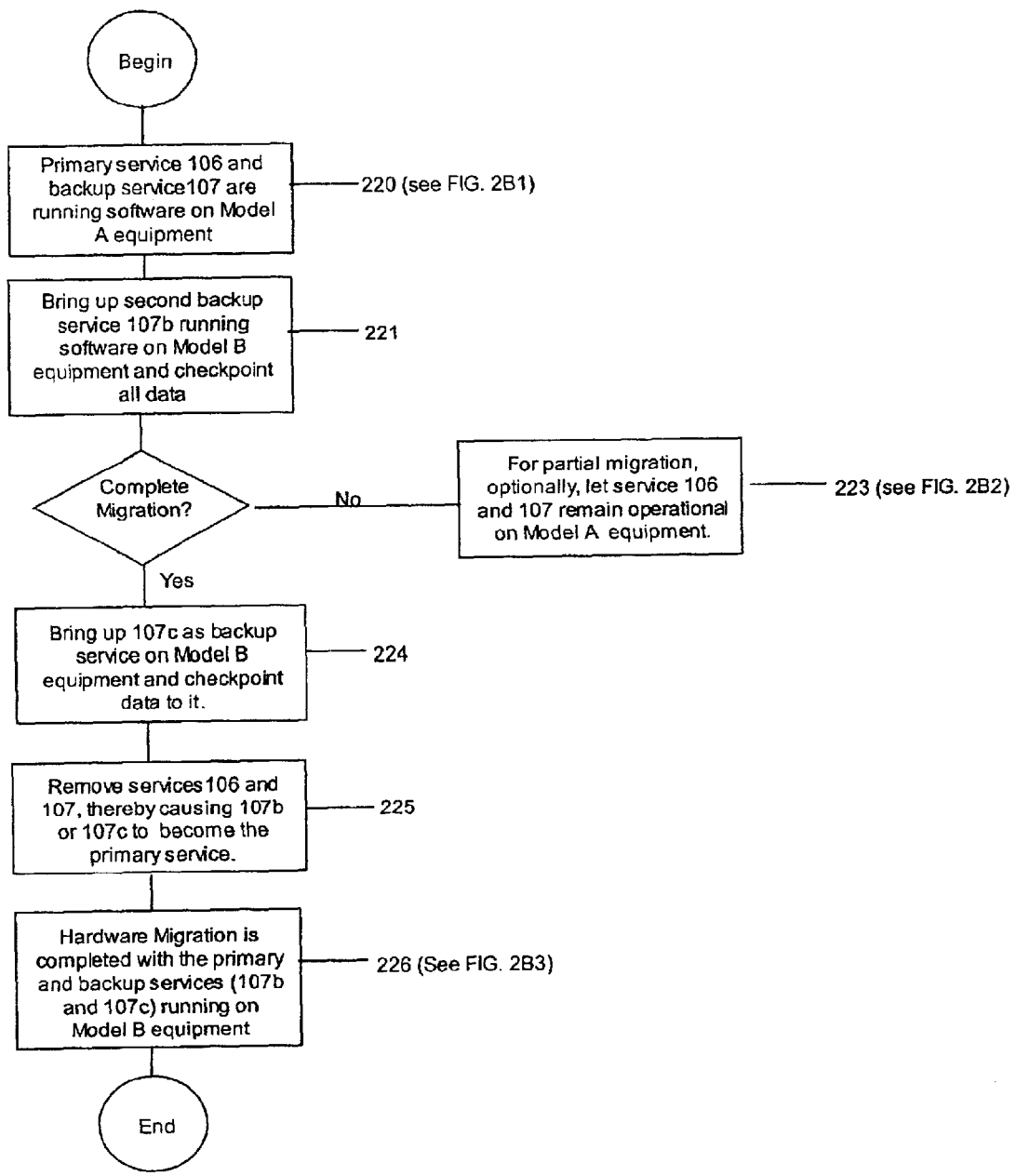
FIG. 2B is a flowchart that provides an overview of hardware migration according to an embodiment.

A corollary to software migration is hardware migration. If the new backups are created on different machines, then over time, migration to different machines allows replacement of older equipment. FIG. 2B is a flowchart that provides an overview of hardware migration in an embodiment of the present invention. In the example shown, the primary service instance (106) and the backup service instance (107) are running on Model A equipment (step 220). See FIG. 2B1 for an example of an initial hardware configuration for an embodiment the present invention. Another backup service instance (107b), which is running on Model B equipment, is brought up and all data is checkpointed to it to allow optional replacement of previous backup service instance (107) running on Model A equipment (step 221). Note that the equipment models are for illustration purposes only and are not limiting. After the second backup service instance (107b) is brought up on Model B equipment, Backup server 107 running on Model A equipment can be optionally removed. If partial migration is desirable, an embodiment of the present invention allows the system to continue running with two backups, one backup service instance 107 running on Model A equipment and one backup service instance 107b running on Model B equipment (step 223). A partial hardware migration configuration is shown in FIG. 2B2. The important point is that fault tolerance via a process pair continues to be maintained whether running on Model A or Model B equipment.

If complete hardware migration is desirable, bring up 107c as a backup service on Model B equipment and checkpoint data to it (step 224). As soon as backup service 107c is brought current, remove services 106 and 107, which are running on Model A equipment (step 225). Removing 106 causes one of the remaining services 107b or 107c, which is running on Model B equipment to become the primary service. The selection of the machine that is to be the primary can be done automatically or manually. In an embodiment of the present invention, machine selection is typically done automatically. The primary service receives and processes all requests from the clients and the old primary 106 running on Model A equipment can be removed without disruption. Hardware migration is completed and the primary (107b) and backup 107c are running on Model B equipment (step 226). FIG. 2B3 shows a completed hardware migration configuration. The steps for partial and complete hardware migration can vary from the steps listed in FIG. 2B. This is an example for illustration purposes only and the order in which services are removed and brought up can vary to achieve migration.

Paramount to migration to different resources, that is, to different hardware or software, is the share-nothing nature of the service instances, that is, service instances do not share any physical resources. Their failure domains are independent and they do not have any version conflicts with respect to the internal state of their private resources. All resources, for example, but without limitation disks, must be duplicated because failure domains share nothing. However, since resources, such as disks, have become inexpensive, not sharing resources is less costly than previously and can greatly simplify creating fault tolerant service instances. Furthermore, because the primary and backup service instances share nothing, they can communicate with each other using only network protocols. It should be noted that hardware, on which services can be replicated, can be dissimilar, for example, but without limitation, "open" components and customized components, or some combination allowing greater applicability of the present invention.

The share-nothing nature of the service instances and communicating via network protocols is in contrast to conventional approaches where the primary and backup processes share resources, for example and without limitation disks, requiring that they maintain the same internal view of the shared resource they are controlling. Maintaining the same internal view requires checkpointing the internal state so that the primary and backup processes represent the internal states the same and can track the work each has done to the shared resource. Typically, checkpointing internal states in these conventional approaches requires internal communication across a bus or some other internal communication path that use of networking protocols. Since in an embodiment of the present invention only the same external view is maintained, the internal state is not tracked and checkpointing is vastly simpler.

Maintaining the same external view means that checkpointing is done for only external requests and messages that make changes to the database. Messages and requests, which return values that do not change regardless of the number of times the operation is performed, are not checkpointed. Any operations, which do not affect the state of the database, for example and without limitation, read operations, are not checkpointed. This is a departure from conventional methods, which checkpoint read operations because internal states must be represented in the same way.

In an embodiment of the present invention, internal states of the primary and its backups can have completely different representations. A primary can be implemented on top of one type of database while the backup can be implemented on top of another type of database. They can continue to communicate with each other using network protocols. The communication model employed by and the checkpointing method of an embodiment of the present invention (which does not perform checkpointing of read operations) will be explained in more detail below.

A client is a sequence of logically related requests, that is, a stream of communication. A client can be, for example and without limitation, a machine, a process on a machine, or a thread within a type of process.

Figure 3A:
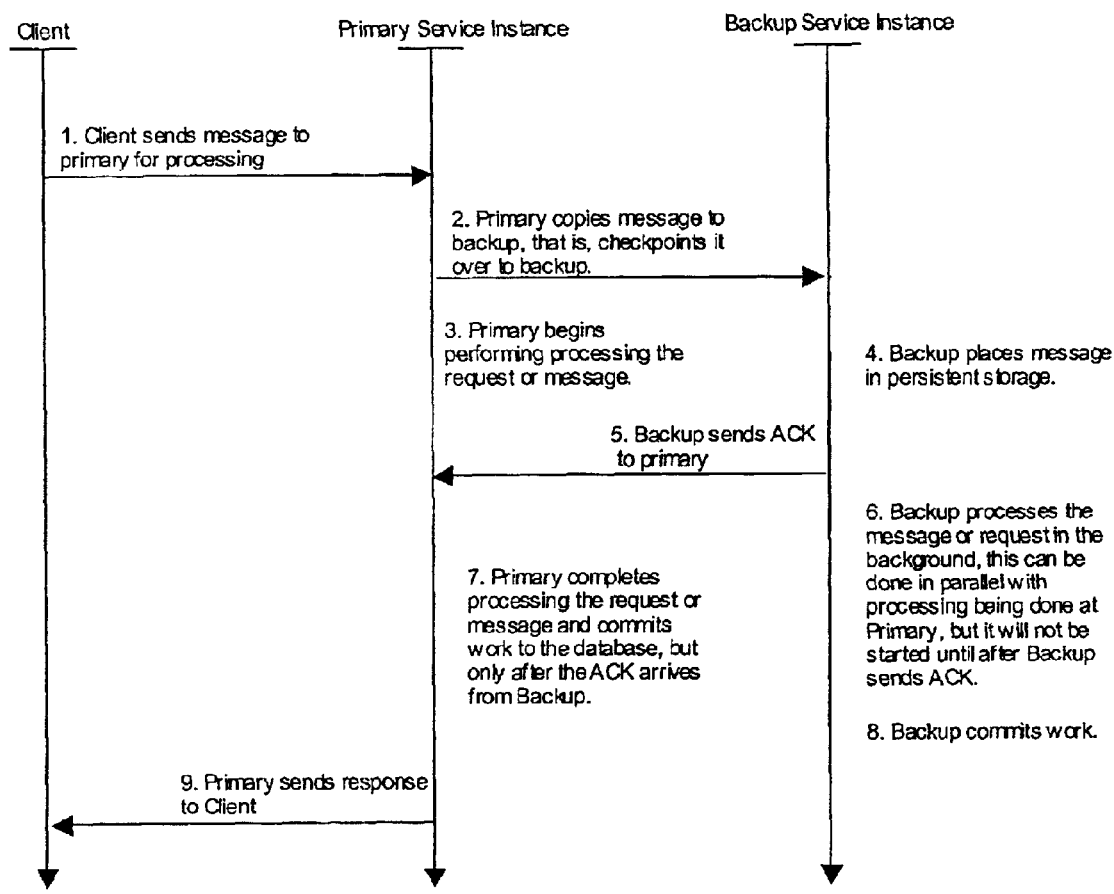
FIG. 3A is a protocol table that provides a general overview of the communication between a client, primary, and backup according to an embodiment.

FIG. 3A shows a general overview of the communication between a client, primary, and backup. As shown, a client, for example, 101a1–101bN in FIG. 1 sends a message or request to a primary, for example, 102a–102N in FIG. 1, for processing (step 1). Upon receiving the message, primary (102a–102N) sends a copy of the message, that is, checkpoints the message to the backup, for example, 104a–104N in FIG. 1 for processing (step 2). Primary (102a–102N) begins processing the request or message (step 3). The backup can defer execution of the request or message. It places the message in persistent storage, for example, an intention log in battery-backed memory, to ensure that the data is safe even if the primary or backup were to fail due to a power failure or some other event. (step 4) The backup (104a–104N) sends an acknowledgment to the primary (102a–102N) (step 5). As a performance optimization, the backup (104a–104N) can process the request or message in the background in parallel with the primary (102a–102N) (step 6). However, the backup will not start processing the request or message until after the backup sends an acknowledgment to the primary (102a–102N) for the request or message. As soon as the acknowledgment arrives at the primary, the primary can commit, that is make the request or message it has processed permanent in the database (step 7). As soon as the message or request is committed, it is irrevocable. When the backup completes processing the message or request, it also commits it to the database (step 8). Typically, a backup (104a–104N) completes its processing shortly after the primary (102a–102N) completes its processing.

A backup is slightly behind the primary in its processing because 1) the backup cannot start its work until after sending an acknowledgment to the primary and 2) the backup processes its work in the background. In addition, requests are independent and are committed in the primary and backup(s) separately. The difference in completion times is usually the time it takes the message to be sent from a primary to its backup and the backup to send the acknowledgment to the primary before starting its own processing. After the backup processes a request, the backup must commit its work to the database. Checkpointing is a form of logical mirroring, so that the logical state of the backup is a mirror copy of the primary. After a primary (102a–102N) commits the request or message to a database, the primary returns a response to the client (101a1–101bN) that sent the request or message (step 9).

Figure 3B:
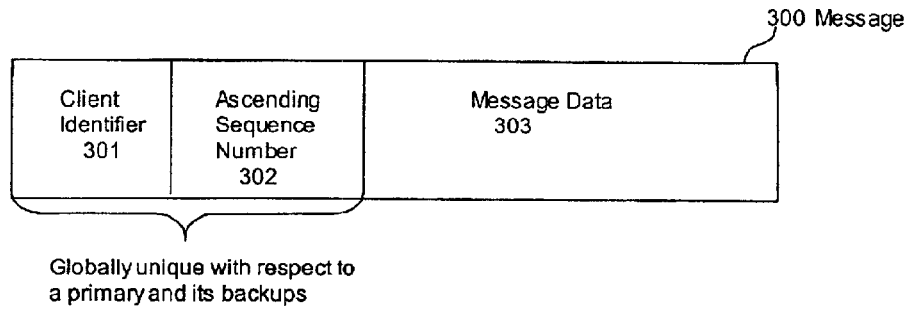
FIG. 3B is a diagram of the components of every message sent from the client to the primary according to an embodiment.

Referring now to FIG. 3B, every message sent from the client to the primary has three parts 1) a client identifier (301) that uniquely identifies the client with its stream of requests 2) an ascending sequence number (302) that the client assigns to a connection when it establishes a connection to the primary, and 3) message data (303). The combination of client identifier and sequence number is globally unique with respect to the primary server and its one or more backups. The same client identifier-sequence number combination can be used for a different primary server and its one or more backups because they are different communication paths. If a new backup gets created, the logical entity that is comprised of the primary and its one or more backups is also unique.

Figure 3C:
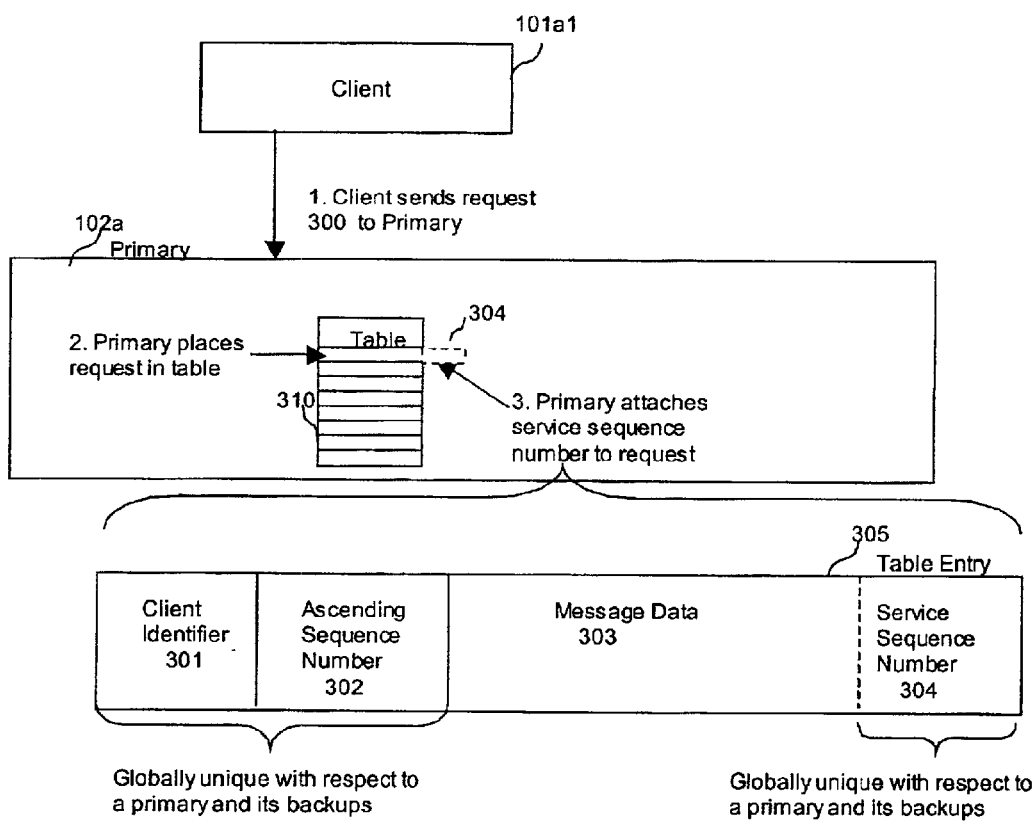
FIG. 3C is a diagram of the work done at the primary to queue and order incoming requests in its message table according to an embodiment.

Unlike conventional checkpointing methods, which allow concurrent operations at a primary and backup for processing messages and requests in a different order, an embodiment of the present invention typically has the backup commit the work for these transactions in order. To maintain the order in which the work is committed, the primary assigns a service sequence number to each request it receives from the client. As shown in FIG. 3C, the client (101a1) sends a request (300) to the primary (102a) (step 1). As the primary (102a) receives/accepts the incoming request (300) from the client (101a), it places the request in a message table (310) (step 2). The primary then attaches a service sequence number (304) to the request resulting in a table entry (305) that includes the original message (300) plus a service sequence number (304) (step 3). The service sequence number is globally unique across the service instance pair (106/107 or 108/109). Attaching the service sequence number ensures that if multiple clients are sending requests to the primary, the backup is able to determine the correct order in which to commit the work for these requests, that is, commit work by order of service sequence number. Committing work to the database by service sequence number ensures that the logical state of the primary and its one or more backups will be updated in the same order with the same results.

Figure 3D:
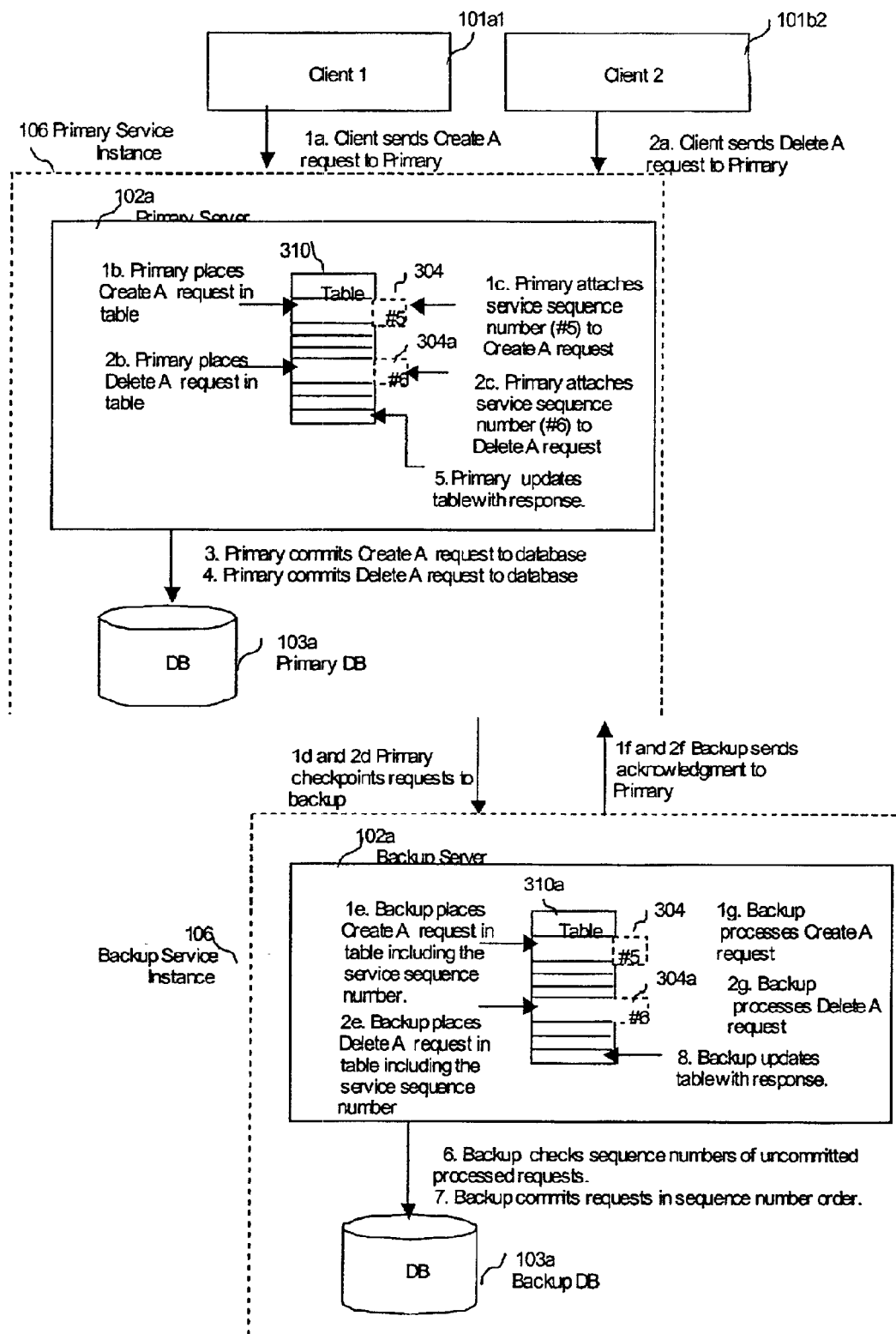
FIG. 3D is a diagram of the process for queuing, ordering, and processing requests at the primary and the backup according to an embodiment.

FIG. 3D shows an example of how the service sequence number is used to dictate the ordering of commits to the database at the backup. As shown, Client 1 sends a Create A request to primary (step 1a). Client 2 sends a Delete A request to primary (step 2a). Upon receipt/acceptance of a request, the primary places the request in its message table (310) (steps 1b and 2b) The primary then attaches a service sequence number, in this example, #5 (304), to the Create A request (step 1c) and #6 (304a), to the Delete A request (step 2c) and checkpoints the request to the backup (steps 1d and 2d). Upon receipt of the requests from the primary, the backup places the Create A request (step 1e) and the Delete A request (step 2e) in its own message table (310a). The requests include the service sequence number (304 and 304a) previously attached to the request by the primary. The backup then sends an acknowledgment to the primary for the Create A and Delete A request (step 1f and 2f respectively). After sending the acknowledgment, the backup can complete its work, that is, process the Create A request (step 1g) and Delete A request (step 2g). Upon receipt of the acknowledgement, the primary can commit the Create A request to its database (103a) (step 3) and then commit the Delete A request to the database (step 4). Committing a request to the database causes the primary to update its message table with the response (step 5)

As shown, a backup could start executing the requests in any order if it has parallel threads. The order of execution is not important, however, for correct operations, the backup must commit the Create A request from Client 1 before committing the Delete A request from Client 2 as indicated by the service sequence number order. If the backup does not commit these requests in this order, an unintended result, for example, A would still exist after committing both requests instead of A no longer existing in the database after committing both requests. Attaching a service sequence number to each request and committing them in sequence obviates unintended results, that is, results caused by processing requests out of order. It should be noted that the backup can commit unrelated requests out of order and the logical state is the same as if the requests have been committed in order. However, on a failover, the backup must complete all pending requests before completing new requests to maintain the correct logical state.

In an embodiment of the present invention, to ensure correct ordering of uncommitted processed requests, the backup checks the service sequence numbers of the processed requests in its table to confirm that requests with lesser service sequence numbers have been committed (step 6). The backup commits requests in service-sequence-number order (step 7). The backup cannot commit the work to the database out of service-sequence-number order. Commits to the database at the backup would be blocked if the work associated with a request with a lower service sequence number has not been committed first. A commit to the database causes the relevant message table at the backup or primary to be updated with the response to the request (step 8). It should be noted that the same response maintained in the primary message table after the commits the work to its database (see step 5 above), is eventually sent to the client from the primary later in the process (see step 8 in FIG. 3A).

The basic fault tolerance model used in this checkpointing scheme is optimized. If a failure occurs after the client sends a request but before the response reaches the client, an independent mechanism rapidly detects the failure. The mechanism informs the client that it must resend the request and to which service instance (primary or backup) it must resend the request. This means that if any failure occurs, the client must close the old connection, make a new connection, resend the message, and wait for a response. If the request fails again, the client must try again.

Figure 4A:
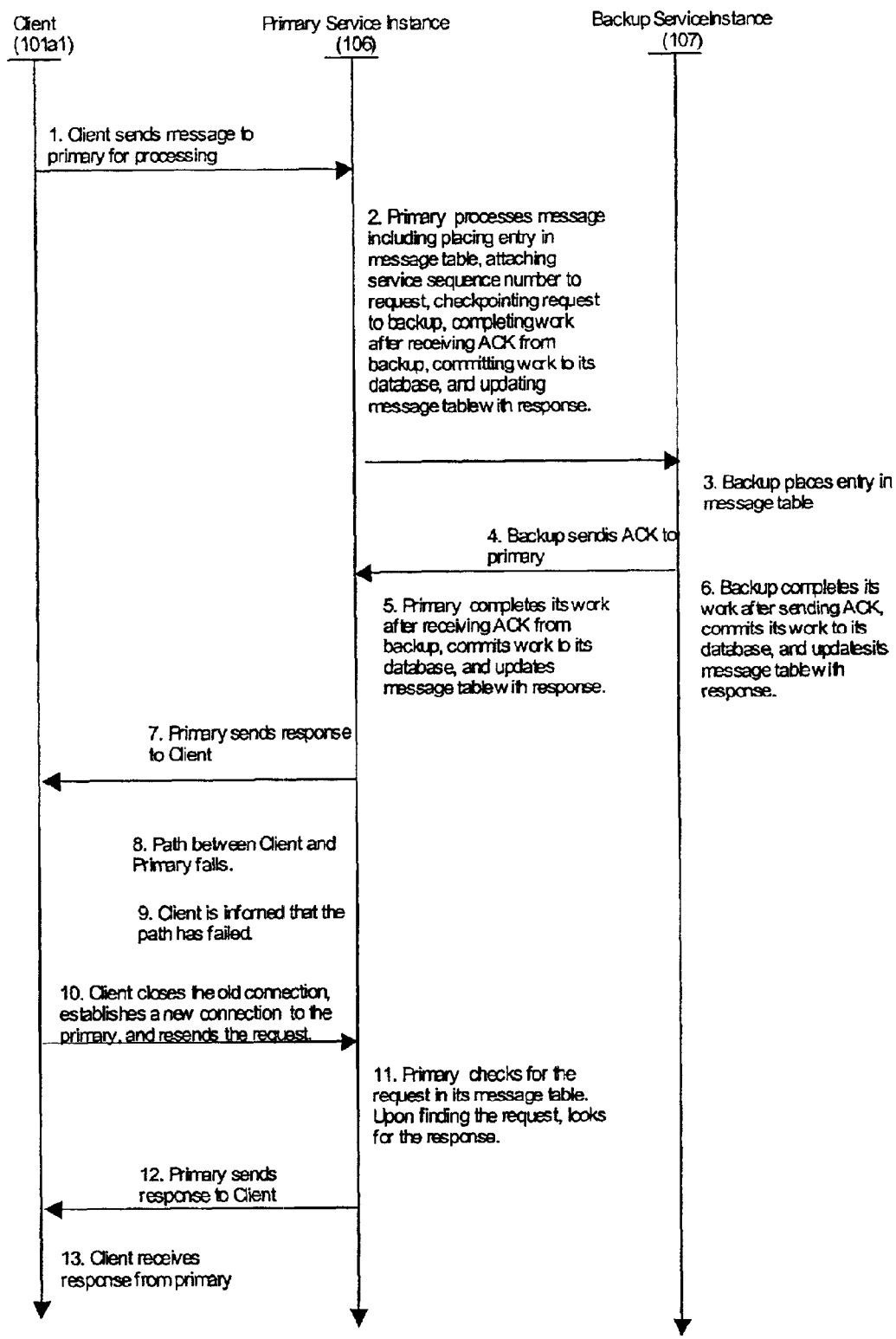
FIG. 4A is a protocol table showing the request processing in the event that a response sent to the client from the primary gets lost as a result of the path failure according to one embodiment.

Referring now to FIG. 4A, it shows the request processing in the event that a response sent to the client from the primary gets lost as a result of the path failure. The typical request processing occurs. The Client sends a message to the primary for processing (step 1). The Primary processes the message in the usual manner. It places an entry in its message table, attaches a service sequence number to the request, checkpoints the request including service sequence number to the backup (step 2). The backup places an entry in its message table (step 3). The backup sends an ACK to the primary (step 4). The primary completes its work related to the request after receiving an ACK from the backup, commits its work to its database, and updates its message table with the response (step 5). As soon as the backup sends an ACK to the primary it can complete its work related to the request, commit its work to the database, and update its message table with the response (step 6). As soon as the primary updates its table with the response, the primary can send the response to the Client (step 7). The path between the Client and the primary fails (step 8). The client is informed that the path has failed (step 9). The mechanism for informing the client of the path failure can be, for example and without limitation, an independent process charged with monitoring the health of the system and providing component status reporting services to the system components or a process within the primary. However, the mechanism is not within the scope of this invention and will not be detailed here. As soon as the client learns that the path has failed, the client closes the old connection, establishes a new connection to the primary, and resends the request (step 10). Instead of performing its work to for the request again and check- pointing the request across to its one or more backups again, the primary only checks its table for the request and corresponding response (step 11). Since the primary has already processed the request it will not perform the work again, but rather only sends to the Client the response to the request contained in its message table (step 12). The Client receives the response from the primary (step 13). This optimization avoids the need to process a request twice in the event of a path failure.

Figure 4B:
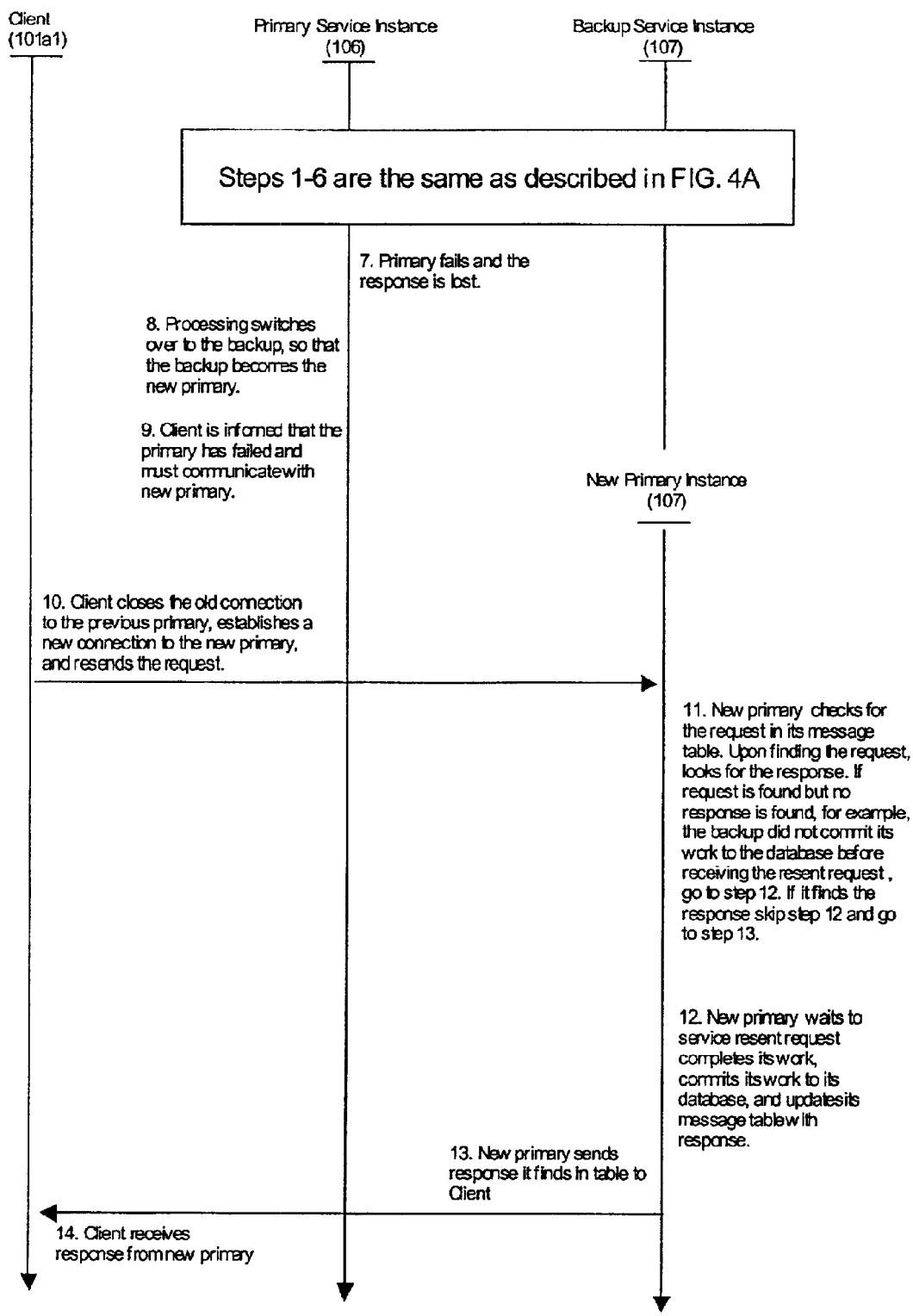
FIG. 4B is a protocol table showing the request processing in the event that a response from the primary gets lost as a result of a primary service instance failure according to one embodiment.

Looking now to FIG. 4B, it shows the request processing in the event the response from the primary gets lost as a result of a primary service instance failure. The typical request processing occurs, that is, steps 1 though 6 are the same as described for FIG. 4A. The primary (106) fails and the response for the Client is lost (step 7). Processing switches over to the backup (107) so that the previous backup (107) becomes the new primary (step 8). A mechanism informs the client that the previous primary (106) is no longer available and that the client must communicate with the new primary (107, the previous backup) for processing requests (step 9). The mechanism for informing the client about the failure and to communicate with the backup service instance can be the same as mentioned above in connection with FIG. 4A, but is not within the scope of this invention. After the client closes the old connection to the previous primary (106) and establishes a new connection to the new primary (107), using the same client identifier and request sequence position, the Client resends the request that experienced the lost response to the new primary (step 10). The new primary (107) checks its message table for the request. If it finds the request, it checks to see if its message table contains a response for the request sequence number (step 11). If the new primary (107) does not have the response in its table for the request, that is, the request was not committed before receiving the resend of the request, the new primary (107) waits to service the resent request until the commit completes and a response is placed in the table (step 12). As soon as the new primary is able to find the response in its message table, the new primary sends the same response as the previous primary (106) would have sent or did send but got lost (step 13). The Client receives the response from the new primary (step 14).

It should be noted that if a client sends multiple requests before waiting for responses, a failure is handled the same. For example, if a client has five requests outstanding, that is, it has not received responses for five requests, the client must resend the requests. In the case of a path failure, the client sends the requests to the primary and the primary checks its table for responses. If the table contains responses to these requests, the primary resends the responses to the client. In the case of a primary failure, the client resends the requests to the backup and the backup checks its table for responses. If the table contains the responses, the backup sends the responses to the client. If the table contains the messages, but does not contain responses, the backup waits until its work for the requests are committed. As soon as they are committed and it updates its table with the responses, it sends the responses to the client.

Therefore, whether a client has a single outstanding request or multiple outstanding requests, the process is the same. The client must re-establish the connection to the current primary, which in some cases may be the previous backup. The client must then resend the message(s). When the current primary receives the request(s), it retrieves the response(s) either from its table, or if the request(s) has not been committed, processes the request(s) again. The primary then returns the response(s) to the client. However, since each response carries the request sequence number, the primary can return responses in any order.

Figure 5A:
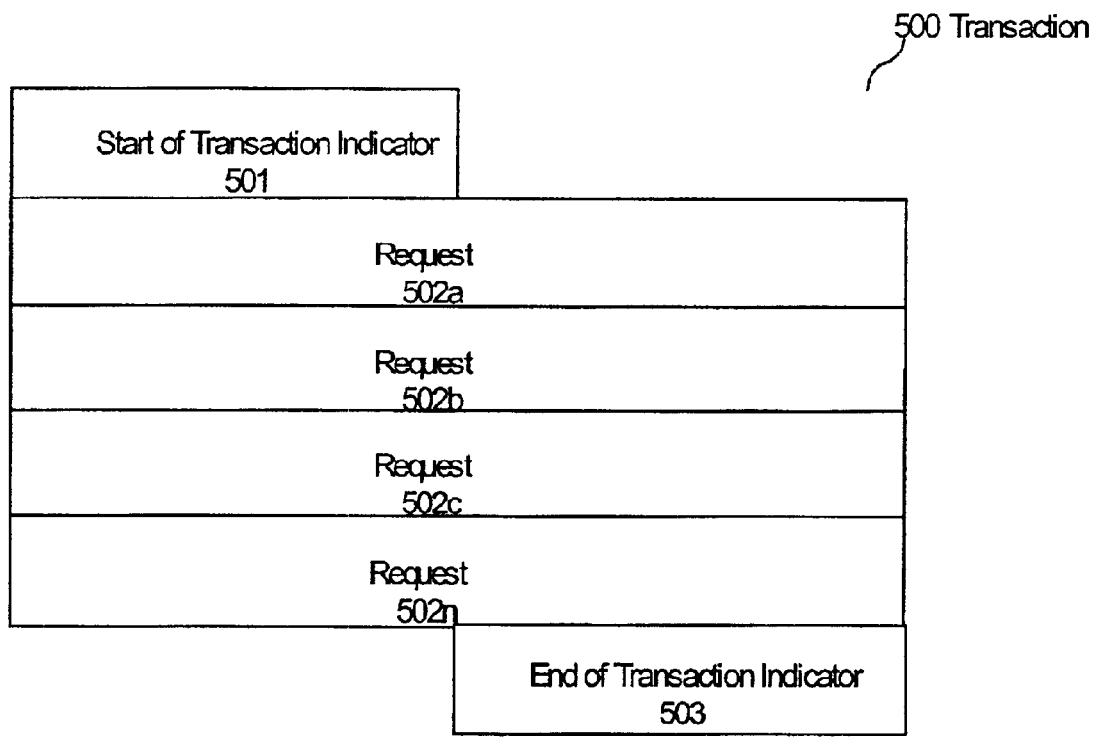
FIG. 5A show the components of a transaction according to an embodiment.
Figure 5B:
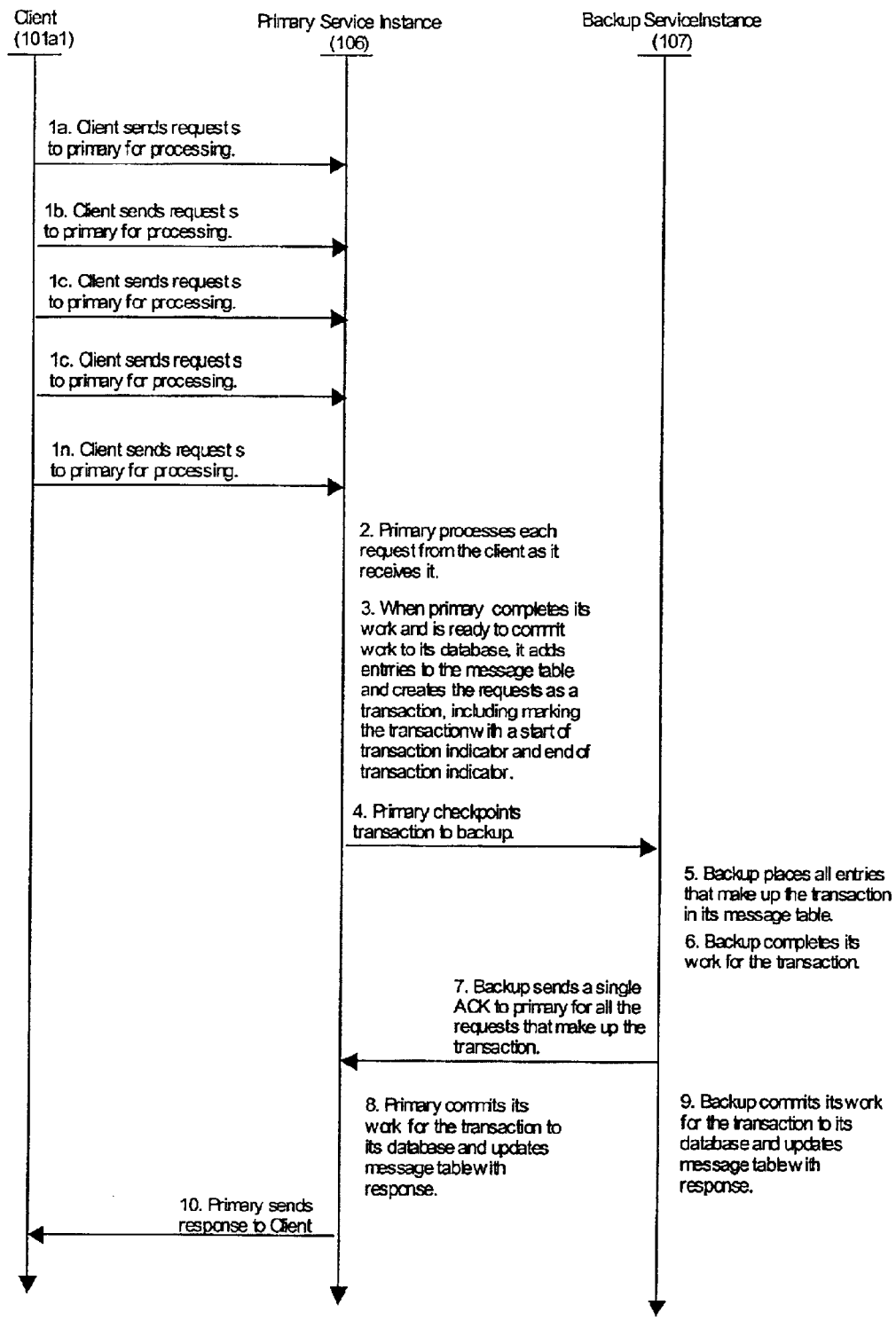
FIGS. 5B and 5C shows a protocol table of the communication used for transaction processing according to an embodiment.
Figure 5C:
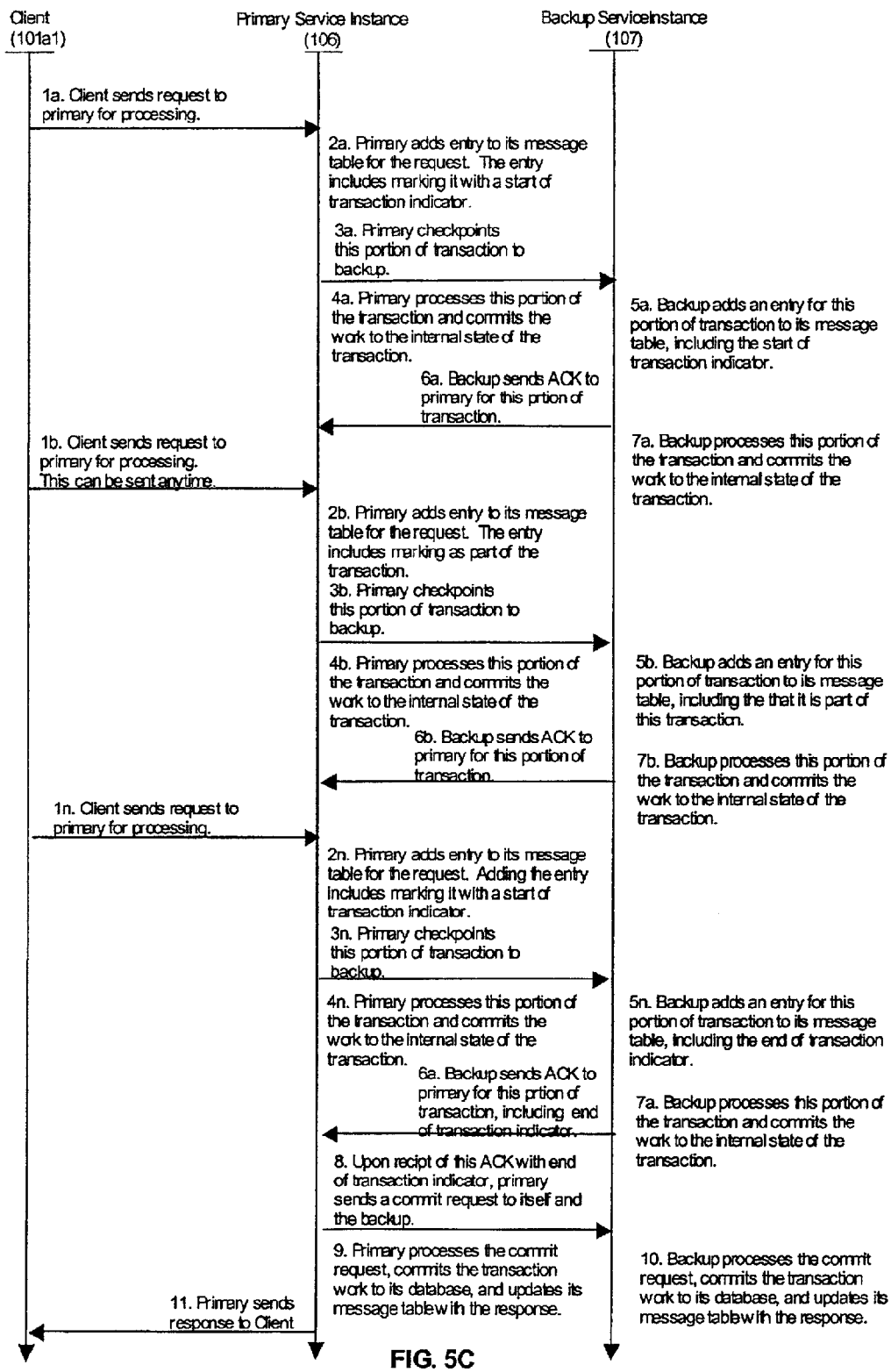

An embodiment of the present invention also supports transaction processing, which includes handling message table entries and handling failures during transaction processing. FIG. 5A shows a transaction for purposes of illustration only and is not limiting. A transaction (500) is defined as having a start of transaction indicator (501) and one or more requests (502a–502n) followed by an end of transaction indicator (503). Table entries that make up a transaction can be processed in a batch as shown in FIG. 5B or individually as shown in FIG. 5C. These figures show transaction table entry handling for purposes of illustration only and are not limiting.

Looking now to FIG. 5B, the primary does not process any table entries until it is time to commit the transaction. The primary processes all the requests that make up the transaction and checkpoints the entire transaction in a batch to the backup at transaction commit time to the database. For example, Client (101a1) sends requests to primary for processing (step 1a–1n). The primary does not add entries to the message table upon receipt of a request. Instead, the primary executes the request as it receives it (step 2). When the primary is ready to commit the requests to its database, it adds entries to the message table to create a transaction. The entries can continue to include service sequence numbers, but must be defined as a transaction using a start of transaction indicator and an end of transaction indicator (step 3). The primary checkpoints the transaction in a batch to the backup (step 4). Checkpointing a transaction in a batch has the advantage of reducing the number of round trips between the primary and backup to send the requests that make up the transaction and the requisite acknowledgments for each request. Reducing the number of round trips means the primary does not wait for an acknowledgment for each request, thereby making the round trips for the intermediate requests faster. However, before the primary can commit the transaction to its database, the primary must first send the batch to the backup, and then the backup must add each request that makes up the transaction to its message table (step 5). After the requests are added to the backup's message table, the backup completes it work for all the requests that make up the transaction (step 6). After the backup completes its work, it sends a single acknowledgment (ACK) to the primary for all the requests that make up the transaction (step 7). The acknowledgment is for a large amount of data at end of the transaction processing. However, with today's network technology, the total transaction service time is less than sending separate requests and waiting for separate acknowledgments, but with the locking of resources that would occur during transaction processing, the resources are tied up longer at the backup while the backup is processing the transaction. After the backup sends the ACK to the primary, the backup commits its work for the transaction to its database and updates its message table with the response (step 8) and the primary commits its work for the transaction to its database and updates its message table with the response (step 9). As soon as the primary commits its work and updates its table with a response, the primary sends the response to the Client (step 10).

Alternatively, the primary can individually process table entries marked as part of a transaction. The primary checkpoints each request that is part of the transaction to the backup and commits the transaction. However, instead of the commit being a transaction commit to the database, the client's commit request is only added to the internal state of the transaction.

Looking now at FIG. 5C, which shows transaction processing of individual table entries. For example, the client (101a1) sends a request to the primary for processing (step 1a–1n). The primary adds an entry to its message table for the request (step 2a–2n). Each entry includes an indication that it is part of a transaction. For example, the first entry added to the table as part of the transaction includes a start of transaction indicator, and the last entry for the transaction includes an end of transaction indicator. After adding an entry to its message table, the primary checkpoints a request individually to the backup (step 3a–3n). The primary processes each portion of the transaction (that is, each request) and commits its work to the internal state of the transaction (step 4a–4n). Meanwhile the backup places the request it receives from the primary, including the indication that the request belongs to a transaction, in its message table (step 5a–5n). The backup sends an acknowledgment (ACK) to the primary for the portion of the transaction that it has received (step 6a–6n). After sending the ACK, the backup processed the portion of the transaction it placed in its message table and commits its work to the internal state of the transaction. As shown, the primary and backup process each request individually, but indicate that a request is part of a transaction. As soon as the primary receives an acknowledgment to the request with the end of transaction indicator, the primary sends a commit request to itself and to the backup (step 8). When the primary receives the acknowledgment from the backup, the primary processes the commit request, commits the entire transaction to its database, and updates its message table with a single response for the transaction. (step 9). Concurrently, the backup processes the commit request, commits the entire transaction to its database, and updates its message table with a single response for the transaction. (Step 10). The primary sends the response associated with the transaction to the client. It should be noted that the primary can use this approach only if the commit at the backup can succeed with certainty. The backup causes any subsequent conflicting transactions to be restarted rather than restarting the oldest transaction; this means, that the older transaction takes precedence over the newer transaction at the backup, so that transactions commit in the same order in the backup as in the primary, in cases of conflicts.

Regardless of the transaction checkpointing model used, so long as the transaction model is the same in both implementations (that is, both the primary and backup use batch or both use individual table entry transaction processing), the same external semantics are preserved including when the internal implementations of the transaction checkpointing model at the primary and backup are completely different. In addition, if a failure occurs during transaction processing (batch and individual) before the checkpoint, the transaction is aborted and the primary must restart the transaction for processing.

Similar to when operating under normal conditions, an embodiment of the present invention must implement checkpointing when the primary or backup is lost. In this event, a new machine must be brought up and made current to avoid a single point of failure. If a primary is lost, the backup becomes the primary and client requests are directed to it. A new empty backup that has no internal state is created on a different machine. The current primary maintains a request history table of service sequence numbers and for remote replication purposes also maintains a log of logical operations out on disk. When the old primary is lost, the new primary notes the starting point in the log and the service sequence number corresponding to that point in the log. The primary copies its current database to the backup, and then in effect, replicates all logical operations and service sequence numbers to the backup after the starting point in the log. The service sequence numbers act as a filtering mechanism to ensure data integrity, in particular, data elements copied at one point in time may be affected by data elements copied later in time. If no filtering is done, the data in the database may not reflect the most current data with all of its transformations.

It should be noted that the primary can leverage any replication mechanism that a computing system may have in place and is not limited to any particular replication mechanism to copy the logical operations and service sequence numbers to the backup.

After noting the starting point in the log, the primary then checks forward through the log for all newer operations that occurred since replication began and applies the operations to the backup. When the backup and primary contain nearly the same information, the primary stops accepting requests from clients in an effort to allow the backup to catch up with the primary's current processing. As soon as the backup has caught up with the primary's current state and the backup sends an acknowledgment, the primary can begin accepting new requests from the client and checkpoint them over to the backup as in a normal checkpointing scheme. Effectively, the primary is processing only new requests and the backup is processing new and old requests in the background until it catches up with the primary. However, straight copying over to the backup such as this can result in a "fuzzy copy". An embodiment of the present invention overcomes the "fuzzy copy" problem by filtering out entries that have already been applied to the data that has been copied to the database.

An embodiment of the present invention provides a method for filtering out entries that have already been applied. The primary uses service sequence numbers as generation label for the data. As entries are placed in the message table with the service sequence number the data in the database also maintains the service sequence numbers as generation numbers. If an attempt is made to apply a change to a service object at the backup where the service sequence number is lower than in the data object, the backup learns that the entry has already been applied and skips the entry.

There is an optimization in the event of a soft failure. For example, if the backup is running on a machine that has a memory parity error or a memory error that is not recoverable, the machine will crash and reboot. However, the metadata on disk remains internally consistent because it is in a database, but it is obsolete because the primary did not send the updates while the backup was rebooting. The backup is missing log entries. In an embodiment of the present invention, if the backup experiences a soft failure, the backup communicates to the primary the last service sequence number it has in its log, that is, recorded on the backup's log on disk. The primary will behave send log entries from the point of the service sequence number. It should be noted that, this optimization occurs only if the primary has not recycled it message table. If the primary has recycled its table and the service sequence number is no longer in the primary's table, the backup will start over as if it were an empty backup being brought up for the first time. Therefore, if the backup experiences a quick reboot, refreshing its data can be done very quickly, applying only those entries with a service sequence number greater than the one communicated by the backup to the primary. If on the other hand, the backup is down for a few weeks and then comes back up, the backup will not updated with current information, instead it will be placed in the spare pool.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A service operating on a computer system to process requests from client processes, comprising:

a primary service instance operating on the computer system, including means for receiving and processing client requests, from the client processes; and at least one backup service instance operating on the computer system, including means for receiving and processing the client requests, wherein each backup service instance is logically equivalent to the primary service instance;

wherein the primary service instance includes means for determining which external requests, when processed by the secondary service instance, are logical requests such that processing of the determined logical requests cause the external view of each backup service instance to change; and means for communicating with each backup service instance to provide an indication of the determined logical requests to each backup service instance; and wherein each backup service instance includes means for communicating, to the primary service instance, acknowledgement of the determined logical requests.

2. The service of claim 1, wherein the primary service instance includes means for committing the determined logical requests in response to the acknowledgements of the determined logical requests.

3. The service of claim 2, wherein each backup service instance includes means for committing the results of processing the determined logical requests.

4. The service of claim 3, further comprising: order ensuring means for ensuring that, for a sequence of determined logical requests, each backup service instance commits the results of processing the determined logical requests in the same order as the primary service instance commits the results.

5. The service of claim 4, wherein: the order ensuring means includes means for maintaining a table of determined logical requests; and each backup service instance includes means for processing the table of determined logical requests to determine an order of committing results of processing the determined logical requests.

6. The service of claim 5, wherein: the means for maintaining a table of determined logical requests includes means for associating sequence values with the determined logical requests; and the means for processing the table includes means for processing the sequence values.

7. The service of claim 2, wherein: a sequence of associated client requests is a transaction; each backup service instance includes means for communicating a single acknowledgement for the client requests of the transaction; and each backup service instance includes means for committing the results of processing the client requests of the transaction as a single commitment.

8. A service operating on a computer system to process requests from client processes, comprising:
- a primary service instance operating on the computer system, including means for receiving and processing client requests, from the client processes; and
- at least one backup service instance operating on the computer system, including means for receiving and processing the client requests, wherein each backup service instance is logically equivalent to the primary service instance;
- wherein the primary service instance includes means for determining which external requests, when processed by the secondary service instance, are logical requests such that processing of the determined logical requests cause the external view of each backup service instance to change; means for communicating with each backup service instance to provide an indication of the determined logical requests to each backup service instance;
- means for receiving an indication of a path failure between the primary service instance and a client process that occurs after a result of processing a particular client request is committed and before the client process receives the result from the service; and means for receiving the particular client request again and for providing the response to the client request without again processing the client request.

9. A service operating on a computer system to process requests from client processes, comprising:
- a primary service instance operating on the computer system, including means for receiving and processing client requests, from the client processes; and
- at least one backup service instance operating on the computer system, including means for receiving and processing the client requests, wherein each backup service instance is logically equivalent to the primary service instance;
- wherein the primary service instance includes means for determining which external requests, when processed by the secondary service instance, are logical requests such that processing of the determined logical requests cause the external view of each backup service instance to change; means for communicating with each backup service instance to provide an indication of the determined logical requests to each backup service instance; and
- wherein each backup service instance includes means for receiving an indication of a failure of the primary service instance, and means for notifying the client process that each backup service instance has become a new primary service instance; and the new primary service instance includes means for receiving client requests and, for client requests that have already been committed by the new primary service instance when the new primary service instance was a backup service instance, providing the committed response to the client request without again processing the request.

10. The service of claim 9, wherein: the new primary service instance includes means for receiving client requests and, for client requests that have already been received but not committed by the new primary service instance when the new primary service instance was a backup service instance, allowing the new primary service instance to continue processing the requests.

11. The service of claim 10, wherein: a sequence of associated client requests is a transaction; each backup service instance includes means for communicating an acknowledgement for each client request of the transaction; and each backup service instance includes means for committing the results of processing the client requests of the transaction as a single commitment.

12. The service of claim 11, wherein: the transaction committing means of each backup service instance includes means for receiving a commitment request from the primary service instance, wherein the transaction committing means commits the results of the transaction in response to the received commitment request.

13. A service operating on a computer system to process requests from client processes, comprising:
- a primary service instance operating on the computer system, including means for receiving and processing client requests, from the client processes; and
- at least one backup service instance operating on the computer system, including means for receiving and processing the client requests, wherein each backup service instance is logically equivalent to the primary service instance;
- wherein the primary service instance includes means for determining which external requests, when processed by the secondary service instance, are logical requests such that processing of the determined logical requests cause the external view of each backup service instance to change; means for communicating with each backup service instance to provide an indication of the determined logical requests to each backup service instance;
- means for creating an additional backup service instance, including means for replicating the logical view of the primary service instance to the additional backup service instance, wherein the means for replicating the logical view of the primary service instance to the additional backup service instance provides the determined logical requests to the additional backup service instance; and
- processes a request history table to ensure that logical view of the additional backup service instance is the same as the logical view of the primary service instance.

14. The service of claim 13, wherein: the replicating means includes means for configuring the determining means to process client requests received while the request history table is being processed.

15. The service of claim 14, wherein the means for configuring the determining means to process client requests received while the request history table is being processed operates in response to a termination of the request history table being processed.

16. The service of claim 15, wherein the transitioning means includes means for configuring the primary service instance to temporarily stop accepting client requests.

17. The service of claim 16, wherein the means for configuring the primary service instance to temporarily stop accepting client requests operates in response to a comparison of the logical view of the primary service instance to the logical view of the additional backup service instance.

18. A service operating on a computer system to process requests from client processes, comprising:
- a primary service instance operating on the computer system, and being adapted to receive and process client requests from the client processes;
- at least one backup service instance operating on the computer system, and being adapted to receive and process the client requests, wherein each backup service instance is logically equivalent to the primary service instance;

wherein the primary service instance determines which external requests, when processed by the secondary service instance, are logical requests such that processing of the determined logical requests cause the external view of each backup service instance to change, and communicates with each backup service instance to provide an indication of the determined logical requests to each backup service instance; and a mechanism for creating and operating an additional backup service instance, including a replicating mechanism for replicating the logical view of the primary service instance to the additional backup service instance, and for providing the determined logical requests to the additional backup service instance.

19. The service of claim 18, wherein: the replicating mechanism is further adapted to process a request history table to ensure that logical view of the additional backup service instance is the same as the logical view of the primary service instance.

20. A service operating on a computer system to process requests from client processes, comprising:

a primary service instance operating on the computer system, and being adapted to receive and process client requests from the client processes;

at least one backup service instance operating on the computer system, and being adapted to receive and process the client requests, wherein each backup service instance is logically equivalent to the primary service instance;

wherein the primary service instance determines which external requests, when processed by the secondary service instance, are logical requests such that processing of the determined logical requests cause the external view of each backup service instance to change, and communicates with each backup service instance to provide an indication of the determined logical requests to each backup service instance; and a mechanism for creating and operating an additional backup service instance, including a replicating mechanism for replicating the logical view of the primary service instance to the additional backup service instance, and for implementing the additional backup service instance to have a physical behavior different from the physical behavior of the primary service instance.

21. The service of claim 20, further comprising: a disabling mechanism for disabling the at least one backup service instance; a mechanism for enabling and operating the at least one backup service instance with an implementation that has the same physical behavior as the additional backup service instance; and a replicating mechanism replicating the logical view of the primary service instance to the at least one backup service instance.

22. The service of claim 21, a disabling mechanism for disabling the primary service instance; and a mechanism for causing at least one of the at least one backup service instance and the additional backup service instance to become a primary service instance.

23. The service of claim 22, a mechanism for creating and operating a second additional backup service instance, including a replicating mechanism for replicating the logical view of the primary service instance to the second additional backup service instance.

24. A service operating on a computer system to process requests from client processes, comprising:

a primary service instance operating on the computer system, and being adapted to receive and process client requests from the client processes;

at least one backup service instance operating on the computer system, and being adapted to receive and process the client requests, wherein each backup service instance is logically equivalent to the primary service instance;

wherein the primary service instance determines which external requests, when processed by the secondary service instance, are logical requests such that processing of the determined logical requests cause the external view of each backup service instance to change, and communicates with each backup service instance to provide an indication of the determined logical requests to each backup service instance; and a mechanism for creating and operating an additional backup service instance, including a replicating mechanism for replicating the logical view of the primary service instance to the additional backup service instance, and for implementing the additional backup service instance to have a physical behavior the same as the physical behavior of the primary service instance.

25. The service of claim 24, further comprising: a disabling mechanism for disabling the at least one backup service instance; a mechanism for enabling and operating the at least one backup service instance with an implementation that has the same physical behavior as the additional backup service instance; and a replicating mechanism for replicating the logical view of the primary service instance to the at least one backup service instance.

26. The service of claim 25, further comprising: a disabling mechanism for disabling the primary service instance; and a mechanism for causing at least one of the at least one backup service instance and the additional backup service instance to become a primary service instance.

27. The service of claim 26, further comprising: a mechanism for creating and operating a second additional backup service instance, including a replicating mechanism for replicating the logical view of the primary service instance to the second additional backup service instance.

28. A method of operating a computer system to process requests from client processes, comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and wherein the step of operating each backup service instance includes communicating, to the primary service instance, acknowledgement of the determined logical requests.

29. A method of operating a computer system to process requests from client processes, comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance, and committing the determined logical requests in response to the acknowledgements of the determined logical requests.

30. The method of claim 29, wherein the step of operating each backup service instance includes committing the results of processing the determined logical requests.

31. The method of claim 30, further comprising: ensuring that, for a sequence of determined logical requests, each backup service instance commits the results of processing the determined logical requests in the same order as the primary service instance commits the results.

32. The method of claim 31, wherein: the order ensuring step includes maintaining a table of determined logical requests; and the step of operating each backup service instance includes processing the table of determined logical requests to determine an order of committing results of processing the determined logical requests.

33. The method of claim 32, wherein: the step of maintaining a table of determined logical requests includes associating sequence values with the determined logical requests; and the step of processing the table includes processing the sequence values.

34. The method of claim 29, wherein: a sequence of associated client requests is a transaction; the step of operating each backup service instance includes communicating a single acknowledgement for the client requests of the transaction; and committing the results of processing the client requests of the transaction as a single commitment.

35. A method of operating a computer system to process requests from client processes, comprising:

operating a primary service instance on the computer system, including receiving and processing client requests, from the client processes; and operating at least one backup service instance on the computer system, including receiving and processing the client requests, wherein each backup service instance is logically equivalent to the primary service instance, wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and wherein: the step of operating the primary service instance includes receiving an indication of a path failure between the primary service instance and a client process that occurs after a result of processing a particular client request is committed and before the client process receives the result from the service, and receiving the particular client request again and providing the response to the client request without again processing the client request.

36. A method of operating a computer system to process requests from client processes, comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and wherein: operating each backup service instance includes receiving an indication of a failure of the primary service instance, and notifying the client process that each backup service instance has become a new primary service instance; and operating the new primary service instance includes receiving client requests and, for client requests that have already been committed by the new primary service instance when the new primary service instance was a backup service instance, providing the committed response to the client request without again processing the request.

37. The method of claim 36, wherein: the step of operating the new primary service instance includes receiving client requests and, for client requests that have already been received but not committed by the new primary service instance when the new primary service instance was a backup service instance, allowing the new primary service instance to continue processing the requests.

38. The method of claim 37, wherein a sequence of associated client requests is a transaction; the step of operating each backup service instance includes the step of operating each backup service instance includes communicating an acknowledgement for each client request of the transaction, and committing the results of processing the client requests of the transaction as a single commitment.

39. The method of claim 38, wherein: committing the results of processing the client requests of a transaction for each backup service instance includes receiving a commitment request from the primary service instance, and committing the results of the transaction in response to the received commitment request.

40. A method of operating a computer system to process requests from client processes, comprising:

operating a primary service instance on the computer system, including receiving and processing client requests, from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change; and communicating with each backup service instance to provide an indication of the determined logical requests to each backup service instance; and creating an additional backup service instance, including replicating the logical view of the primary service instance to the additional backup service instance; wherein the step of replicating the logical view of the primary service instance to the additional backup service instance includes providing the determined logical requests to the additional backup service instance, and processing a request history table to ensure that logical view of the additional backup service instance is the same as the logical view of the primary service instance.

41. The method of claim 40, wherein: the step of replicating the logical view of the primary service instance includes configuring the determining step to process client requests received while the request history table is being processed.

42. The method of claim 41, wherein the step of configuring the determining step to process client requests received while the request history table is being processed is performed in response to a termination of the request history table being processed.

43. The method of claim 42, wherein the transitioning step includes configuring the replacement primary service instance to temporarily stop accepting client requests.

44. The method of claim 43, wherein the step of configuring the replacement primary service instance to temporarily stop accepting client requests is performed in response to a comparison of the logical view of the primary service instance to the logical view of the additional backup service instance.

45. A method of operating a service on a computer system to process requests from client processes, comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the step of replicating the logical view of the primary service instance to the additional backup service instance includes providing the determined logical requests to the additional backup service instance.

46. A method of operating a service on a computer system to process requests from client processes, comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the replicating step includes processing a request history table to ensure that logical view of the additional backup service instance is the same as the logical view of the primary service instance.

47. A method of operating a service on a computer system to process requests from client processes, comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the step of replicating the logical view of the primary service instance to the additional backup service instance includes implementing the additional backup service instance to have a physical behavior different from the physical behavior of the primary service instance.

48. The method of claim 47, further comprising: disabling the at least one backup service instance; enabling and operating the at least one backup service instance with an implementation that has the same physical behavior as the additional backup service instance; and replicating the logical view of the primary service instance to the at least one backup service instance.

49. The method of claim 48, comprising: disabling the primary service instance; and causing at least one of the at least one backup service instance and the additional backup service instance to become a primary service instance.

50. The method of claim 49, further comprising: creating and operating a second additional backup service instance, including replicating the logical view of the primary service instance to the second additional backup service instance.

51. A method of operating a service on a computer system to process requests from client processes, comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance, wherein: the step of replicating the logical view of the primary service instance to the additional backup service instance includes implementing the additional backup service instance to have a physical behavior the same as the physical behavior of the primary service instance.

52. The method of claim 51, further comprising: disabling the at least one backup service instance; enabling and operating the at least one backup service instance with an implementation that has the same physical behavior as the additional backup service instance; and replicating the logical view of the primary service instance to the at least one backup service instance.

53. The method of claim 52, further comprising: disabling the primary service instance; and causing at least one of the at least one backup service instance and the additional backup service instance to become a primary service instance.

54. The method of claim 53, further comprising: creating and operating a second additional backup service instance, including replicating the logical view of the primary service instance to the second additional backup service instance.

55. A program storage device readable by a machine tangibly embodying a program of instructions executable by the machine to perform method steps for operating a computer system to process requests from client processes, said method steps comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and wherein the step of operating each backup service instance includes communicating, to the primary service instance, acknowledgement of the determined logical requests.

56. The program storage device of claim 55, wherein the step of operating the primary service instance includes committing the determined logical requests in response to the acknowledgements of the determined logical requests.

57. The program storage device of claim 56, wherein the step of operating each backup service instance includes committing the results of processing the determined logical requests.

58. The program storage device of claim 57, further comprising: ensuring that, for a sequence of determined logical requests, each backup service instance commits the results of processing the determined logical requests in the same order as the primary service instance commits the results.

59. The program storage device of claim 58, wherein: step order ensuring step includes maintaining a table of determined logical requests; and the step of operating each backup service instance includes processing the table of determined logical requests to determine an order of committing results of processing the determined logical requests.

60. The program storage device of claim 59, wherein: the step of maintaining a table of determined logical requests includes associating sequence values with the determined logical requests; and the step of processing the table includes processing the sequence values.

61. The program storage device of claim 56, wherein: a sequence of associated client requests is a transaction; the step of operating each backup service instance includes communicating a single acknowledgement for the client requests of the transaction; and the step of operating each backup service instance includes committing the results of processing the client requests of the transaction as a single commitment.

62. A program storage device readable by a machine tangibly embodying a program of instructions executable by the machine to perform method steps for operating a computer system to process requests from client processes, said method steps comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, communicating with each backup service instance to provide an indication of the determined logical requests to each backup service instance, receiving an indication of a path failure between the primary service instance and a client process that occurs after a result of processing a particular client request is committed and before the client process receives the result from the service, and receiving the particular client request again and providing the response to the client request without again processing the client request.

63. A program storage device readable by a machine tangibly embodying a program of instructions executable by the machine to perform method steps for operating a computer system to process requests from client processes, said method steps comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance;

wherein the step of operating each backup service instance includes receiving an indication of a failure of the primary service instance, and notifying the client process that each backup service instance has become a new primary service instance; and wherein the step of operating the new primary service instance includes receiving client requests and, for client requests that have already been committed by the new primary service instance when the new primary service instance was a backup service instance, providing the committed response to the client request without again processing the request.

64. The program storage device of claim 63, wherein: the step of operating the new primary service instance includes receiving client requests and, for client requests that have already been received but not committed by the new primary service instance when the new primary service instance was a backup service instance, allowing the new primary service instance to continue processing the requests.

65. The program storage device of claim 63, wherein: a sequence of associated client requests is a transaction; the step of operating each backup service instance includes communicating an acknowledgement for each client request of the transaction; and the step of operating each backup service instance includes committing the results of processing the client requests of the transaction as a single commitment.

66. The program storage device of claim 65, wherein: the step of committing a transaction for each backup service instance includes receiving a commitment request from the primary service instance, wherein the transaction committing step includes committing the results of the transaction in response to the received commitment request.

67. A program storage device readable by a machine tangibly embodying a program of instructions executable by the machine to perform method steps for operating a computer system to process requests from client processes, said method steps comprising:

operating a primary service instance on the computer system, including receiving and processing client requests, from the client processes; and operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating an additional backup service instance, including replicating the logical view of the primary service instance to the additional backup service instance;

wherein the step of replicating the logical view of the primary service instance to the additional backup service instance includes providing the determined logical requests to the additional backup service instance, and processing a request history table to ensure that logical view of the additional backup service instance is the same as the logical view of the primary service instance.

68. The program storage device of claim 67, wherein: the step of replicating the logical view of the primary service instance includes configuring the determining step to process client requests received while the request history table is being processed.

69. The program storage device of claim 68, wherein the step of configuring the determining step to process client requests received while the request history table is being processed is performed in response to a termination of the request history table being processed.

70. The program storage device of claim 69, wherein the transitioning step includes configuring the replacement primary service instance to temporarily stop accepting client requests.

71. The program storage device of claim 70, wherein the step of configuring the replacement primary service instance to temporarily stop accepting client requests is performed in response to a comparison of the logical view of the primary service instance to the logical view of the additional backup service instance.

72. A program storage device readable by a machine tangibly embodying a program of instructions executable by the machine to perform method steps for operating a computer system to process requests from client processes, said method steps comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the step of replicating the logical view of the primary service instance to the additional backup service instance includes providing the determined logical requests to the additional backup service instance.

73. The program storage device of claim 72, wherein: the replicating step includes processing a request history table to ensure that logical view of the additional backup service instance is the same as the logical view of the primary service instance.

74. A program storage device readable by a machine tangibly embodying a program of instructions executable by the machine to perform method steps for operating a computer system to process requests from client processes, said method steps comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the step of replicating the logical view of the primary service instance to the additional backup service instance includes implementing the additional backup service instance to have a physical behavior different from the physical behavior of the primary service instance.

75. The program storage device of claim 74, further comprising: disabling the at least one backup service instance; enabling and operating the at least one backup service instance with an implementation that has the same physical behavior as the additional backup service instance; and replicating the logical view of the primary service instance to the at least one backup service instance.

76. The program storage device of claim 75, further comprising: disabling the primary service instance; and causing at least one of the at least one backup service instance and the additional backup service instance to become a primary service instance.

77. The program storage device of claim 76, further comprising: creating and operating a second additional backup service instance, including replicating the logical view of the primary service instance to the second additional backup service instance.

78. A program storage device readable by a machine tangibly embodying a program of instructions executable by the machine to perform method steps for operating a computer system to process requests from client processes, said method steps comprising:

operating a primary service instance on the computer system, including receiving and processing client requests from the client processes;

operating at least one backup service instance on the computer system, including receiving and processing the client requests, wherein each backup service instance is logically equivalent to the primary service instance;

wherein the step of operating the primary service instance includes determining which external requests, when processed by the secondary service instance, are logical requests such that processing of the determined logical requests cause the external view of each backup service instance to change, and communicating with each backup service instance to provide an indication of the determined logical requests to each backup service instance; and creating and operating an additional backup service instance, including replicating the logical view of the primary service instance to the additional backup service instance;

wherein: the step of replicating the logical view of the primary service instance to the additional backup service instance includes implementing the additional backup service instance to have a physical behavior the same as the physical behavior of the primary service instance.

79. The program storage device of claim 78, further comprising: disabling the at least one backup service instance; enabling and operating the at least one backup service instance with an implementation that has the same physical behavior as the additional backup service instance; and replicating the logical view of the primary service instance to the at least one backup service instance.

80. The program storage device of claim 79, further comprising: disabling the primary service instance; and causing at least one of the at least one backup service instance and the additional backup service instance to become a primary service instance.

81. The program storage device of claim 80, further comprising: creating and operating a second additional backup service instance, including replicating the logical view of the primary service instance to the second additional backup service instance.

* * * * *